United States Patent
Ito et al.

(10) Patent No.: US 10,124,455 B2
(45) Date of Patent: Nov. 13, 2018

(54) THEFT-DETERRENCE SYSTEM FOR POWER TOOL SYSTEM, AND ADAPTER AND METHOD THEREFOR

(75) Inventors: Kosuke Ito, Anjo (JP); Hitoshi Suzuki, Anjo (JP); Nobuyasu Furui, Anjo (JP); Masaaki Fukumoto, Anjo (JP); Takuya Umemura, Anjo (JP); Hitoshi Sengiku, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 814 days.

(21) Appl. No.: 14/233,814

(22) PCT Filed: Jul. 19, 2012

(86) PCT No.: PCT/JP2012/004607
§ 371 (c)(1),
(2), (4) Date: Jan. 20, 2014

(87) PCT Pub. No.: WO2013/014890
PCT Pub. Date: Jan. 31, 2013

(65) Prior Publication Data
US 2014/0158389 A1    Jun. 12, 2014

Related U.S. Application Data

(60) Provisional application No. 61/593,533, filed on Feb. 1, 2012, provisional application No. 61/578,231, filed (Continued)

(51) Int. Cl.
*B25F 5/00*    (2006.01)
*B23Q 5/54*    (2006.01)

(52) U.S. Cl.
CPC . *B23Q 5/54* (2013.01); *B25F 5/00* (2013.01)

(58) Field of Classification Search
CPC .................................. B25F 5/00; B25B 21/00
(Continued)

(56) References Cited

U.S. PATENT DOCUMENTS 5,680,026 A    10/1997    Lueschen
5,809,432 A    9/1998    Yamashita
(Continued)

FOREIGN PATENT DOCUMENTS

CN    1817570 A    8/2006
DE    4204420 A    8/1993
(Continued)

OTHER PUBLICATIONS

Office Action from the Japanese Patent Office dated Jul. 5, 2016 in related Japanese application No. 2014-503345, and translation of substantive portions thereof.
(Continued)

*Primary Examiner* — Andrew M Tecco
*Assistant Examiner* — Chelsea Stinson
(74) *Attorney, Agent, or Firm* — J-Tek Law PLLC; Jeffrey D. Tekanic; Scott T. Wakeman

(57) ABSTRACT

A power tool system includes a hand-held power tool having a motor or a solenoid that drives a tool, and a first memory that stores at least one pass code. A battery pack is detachably attached to, and supplies current to, the power tool and has a second memory that stores at least one pass code. An electronically-actuatable lock and a first controller are provided in the power tool and/or in the battery pack. The first controller reads the pass codes from the first and second memories when the battery pack is attached to the power tool, directly compares the pass codes from the first memory and the second memory, and causes the first electronically-actuatable lock to prohibit or impair operation of the power
(Continued)

tool when the pass codes do not match or otherwise correspond in a predetermined manner.

25 Claims, 17 Drawing Sheets

Related U.S. Application Data on Dec. 20, 2011, provisional application No. 61/564,513, filed on Nov. 29, 2011, provisional application No. 61/511,092, filed on Jul. 24, 2011.

(58) Field of Classification Search
USPC .................................................. 173/2, 4, 20
See application file for complete search history.

(56) References Cited

U.S. PATENT DOCUMENTS

| | | | | |
|---|---|---|---|---|
| 5,945,803 A * | 8/1999 | Brotto | ............... | G01R 31/3665 320/106 |
| 6,154,007 A | 11/2000 | Shaver et al. | | |
| 6,390,205 B2 * | 5/2002 | Wallgren | ............... | B25B 21/00 173/171 |
| 6,469,615 B1 | 10/2002 | Kady et al. | | |
| 6,502,949 B1 * | 1/2003 | Horiyama | .......... | B23Q 11/0046 173/217 |
| 6,577,104 B2 | 6/2003 | Sakakibara | | |
| 6,803,744 B1 | 10/2004 | Sabo | | |
| 6,845,279 B1 | 1/2005 | Gilmore et al. | | |
| 6,870,089 B1 | 3/2005 | Gray | | |
| 6,872,121 B2 | 3/2005 | Wiesner et al. | | |
| 6,876,173 B2 * | 4/2005 | Mastaler | ............... | H02J 7/0045 320/114 |
| 6,972,542 B2 * | 12/2005 | Patino | ................... | H01M 10/42 320/106 |
| 7,030,590 B2 | 4/2006 | Sakakibara et al. | | |
| 7,054,696 B2 * | 5/2006 | Crowell | ............... | B23D 59/008 173/1 |
| 7,079,038 B2 * | 7/2006 | Wendelrup | ............ | H02J 7/0004 320/106 |
| 7,227,333 B2 * | 6/2007 | Yamada | ................ | H01M 10/48 320/106 |
| 7,227,335 B2 | 6/2007 | Sakakibara et al. | | |
| 7,273,159 B2 | 9/2007 | Brotto | | |
| 7,346,422 B2 * | 3/2008 | Tsuchiya | .............. | B23D 59/008 700/168 |
| 7,357,526 B2 | 4/2008 | Zeiler | | |
| 7,394,347 B2 * | 7/2008 | Kady | ....................... | B25F 5/00 340/5.1 |
| 7,439,706 B2 * | 10/2008 | Brenner | ................ | H02J 7/0036 307/125 |
| 7,492,121 B2 * | 2/2009 | Kim | ....................... | H02J 7/0003 320/106 |
| 7,629,766 B2 * | 12/2009 | Sadow | ................... | H02J 7/0044 173/217 |
| 7,688,025 B2 * | 3/2010 | Komaki | ................... | G06F 1/28 112/122 |
| 7,701,172 B2 * | 4/2010 | Watson | .................... | B25F 5/02 320/107 |
| 7,868,591 B2 * | 1/2011 | Phillips | .................... | B25F 5/00 307/150 |
| 7,953,965 B2 * | 5/2011 | Qin | ....................... | G06F 9/4401 713/1 |
| 8,169,298 B2 * | 5/2012 | Wiesner | ............. | G08B 13/1409 340/10.33 |
| 8,354,183 B2 * | 1/2013 | Konuma | ................... | B25F 5/02 320/114 |
| 8,890,468 B2 * | 11/2014 | Bauer | ................... | H01R 31/06 320/107 |
| 9,055,033 B2 * | 6/2015 | Mergener | ................ | H04L 69/03 |
| 2001/0010455 A1 | 8/2001 | Brotto et al. | | |
| 2002/0156537 A1 | 10/2002 | Sakakibara et al. | | |
| 2003/0043016 A1 | 3/2003 | Kady et al. | | |
| 2003/0107470 A1 * | 6/2003 | Kady | ...................... | B25F 5/00 340/5.21 |
| 2003/0182916 A1 | 10/2003 | Iida et al. | | |
| 2003/0203669 A1 | 10/2003 | Glauning | | |
| 2004/0069920 A1 | 4/2004 | Dirks | | |
| 2004/0070369 A1 | 4/2004 | Sakakibara | | |
| 2004/0144552 A1 | 7/2004 | Suzuki et al. | | |
| 2004/0160212 A1 * | 8/2004 | Mastaler | ............... | H02J 7/0045 320/115 |
| 2005/0035738 A1 * | 2/2005 | Patino | ................... | H01M 10/42 320/106 |
| 2005/0048359 A1 * | 3/2005 | Yamada | ................ | H01M 10/48 429/90 |
| 2005/0069391 A1 | 3/2005 | Dils et al. | | |
| 2005/0075149 A1 | 4/2005 | Gerber et al. | | |
| 2005/0111214 A1 | 5/2005 | Zeiler | | |
| 2005/0173142 A1 | 8/2005 | Cutler et al. | | |
| 2005/0267998 A1 | 12/2005 | Ferguson et al. | | |
| 2006/0071753 A1 | 4/2006 | Lamar | | |
| 2006/0096771 A1 | 5/2006 | Brotto | | |
| 2006/0112572 A1 | 6/2006 | Mccambridge et al. | | |
| 2006/0142894 A1 | 6/2006 | Tsuchiya et al. | | |
| 2006/0155582 A1 | 7/2006 | Brown | | |
| 2006/0179473 A1 * | 8/2006 | Innami | ..................... | B25F 5/00 726/2 |
| 2008/0008928 A1 | 1/2008 | Partin et al. | | |
| 2008/0238609 A1 | 10/2008 | Wiesner et al. | | |
| 2009/0015372 A1 | 1/2009 | Kady | | |
| 2009/0096430 A1 | 4/2009 | Van Der et al. | | |
| 2009/0145621 A1 | 6/2009 | Lau et al. | | |
| 2009/0250364 A1 * | 10/2009 | Gerold | ................... | B25H 3/006 206/349 |
| 2009/0291330 A1 | 11/2009 | Onnerud et al. | | |
| 2010/0096151 A1 | 4/2010 | Ostling | | |
| 2010/0134984 A1 | 6/2010 | Lum et al. | | |
| 2010/0141207 A1 * | 6/2010 | Phillips | .................... | B25F 5/00 320/114 |
| 2010/0176766 A1 * | 7/2010 | Brandner | ................ | B25F 5/00 320/136 |
| 2011/0073343 A1 * | 3/2011 | Sawano | .................... | B25F 5/00 173/217 |
| 2011/0140654 A1 | 6/2011 | Osswald et al. | | |
| 2011/0148344 A1 | 6/2011 | Manor et al. | | |
| 2011/0189512 A1 | 8/2011 | Onnerud et al. | | |
| 2012/0111589 A1 * | 5/2012 | Schmidt | .................... | B25F 5/00 173/1 |
| 2012/0238119 A1 * | 9/2012 | Rejman | .................... | B25F 5/02 439/266 |
| 2012/0267134 A1 | 10/2012 | Matthias et al. | | |
| 2012/0302101 A1 * | 11/2012 | Brotto | .................... | B25F 5/029 439/638 |
| 2013/0109375 A1 | 5/2013 | Zeiler et al. | | |
| 2014/0132392 A1 | 5/2014 | Kady | | |
| 2015/0277428 A1 | 10/2015 | Dackefjord | | |
| 2017/0062877 A1 | 3/2017 | Fukumoto et al. | | |

FOREIGN PATENT DOCUMENTS

| | | |
|---|---|---|
| DE | 9311901 | 12/1993 |
| DE | 10127821 C1 | 7/2002 |
| DE | 202006014606 | 1/2007 |
| DE | 102008060703 A | 6/2009 |
| DE | 102009045946 A | 4/2011 |
| EP | 1251618 A | 10/2002 |
| EP | 1690648 A | 8/2006 |
| EP | 1852760 A | 11/2007 |
| EP | 2072192 A | 6/2009 |
| GB | 2386746 A | 9/2003 |
| GB | 2420487 A | 5/2006 |
| JP | S61142372 | 9/1986 |
| JP | H10275635 A | 10/1998 |
| JP | 2001520944 A | 11/2001 |
| JP | 2002313433 A | 10/2002 |
| JP | 2004042849 A | 2/2004 |
| JP | 2004145896 A | 5/2004 |
| JP | 2004181549 A | 7/2004 |
| JP | 2004218293 A | 8/2004 |

(56) References Cited

FOREIGN PATENT DOCUMENTS

| | | | |
|---|---|---|---|
| JP | 2005051763 A | 2/2005 |
| JP | 2005342796 A | 12/2005 |
| JP | 2006218575 A | 8/2006 |
| JP | 2007156675 A | 6/2007 |
| JP | 2007253945 A | 10/2007 |
| JP | 2007285972 A | 11/2007 |
| JP | 2009535007 A | 9/2009 |
| JP | 2010173044 A | 8/2010 |
| WO | 9922277 A1 | 5/1999 |
| WO | 0241465 A | 5/2002 |
| WO | 2006044693 A | 4/2006 |
| WO | 2007042924 A | 4/2007 |
| WO | 2007058596 A | 5/2007 |
| WO | 2007121533 A | 11/2007 |
| WO | 2008088266 A | 7/2008 |
| WO | 2011032803 A | 3/2011 |
| WO | 2012123210 A | 9/2012 |

OTHER PUBLICATIONS

Office Action from the Chinese Patent Office dated Feb. 2, 2015 in counterpart Chinese Patent Application No. 201280037013.5; and translation thereof.
Un-published U.S. Appl. No. 14/004,951.
International Search Report from PCT/JP2012/004607.
Written Opinion from PCT/JP2012/004607.
Office Action from the Japanese Patent Office dated Sep. 27, 2016 in related Japanese application No. 2014-503345, and translation of substantive portions thereof.
Office Action from the Japanese Patent Office dated Nov. 7, 2017 in counterpart Japanese application No. 2016-251976, and translation thereof.
Office Action from the Japanese Patent Office dated Mar. 20, 2018 in counterpart Japanese application No. 2016-251976, and translation thereof.

* cited by examiner

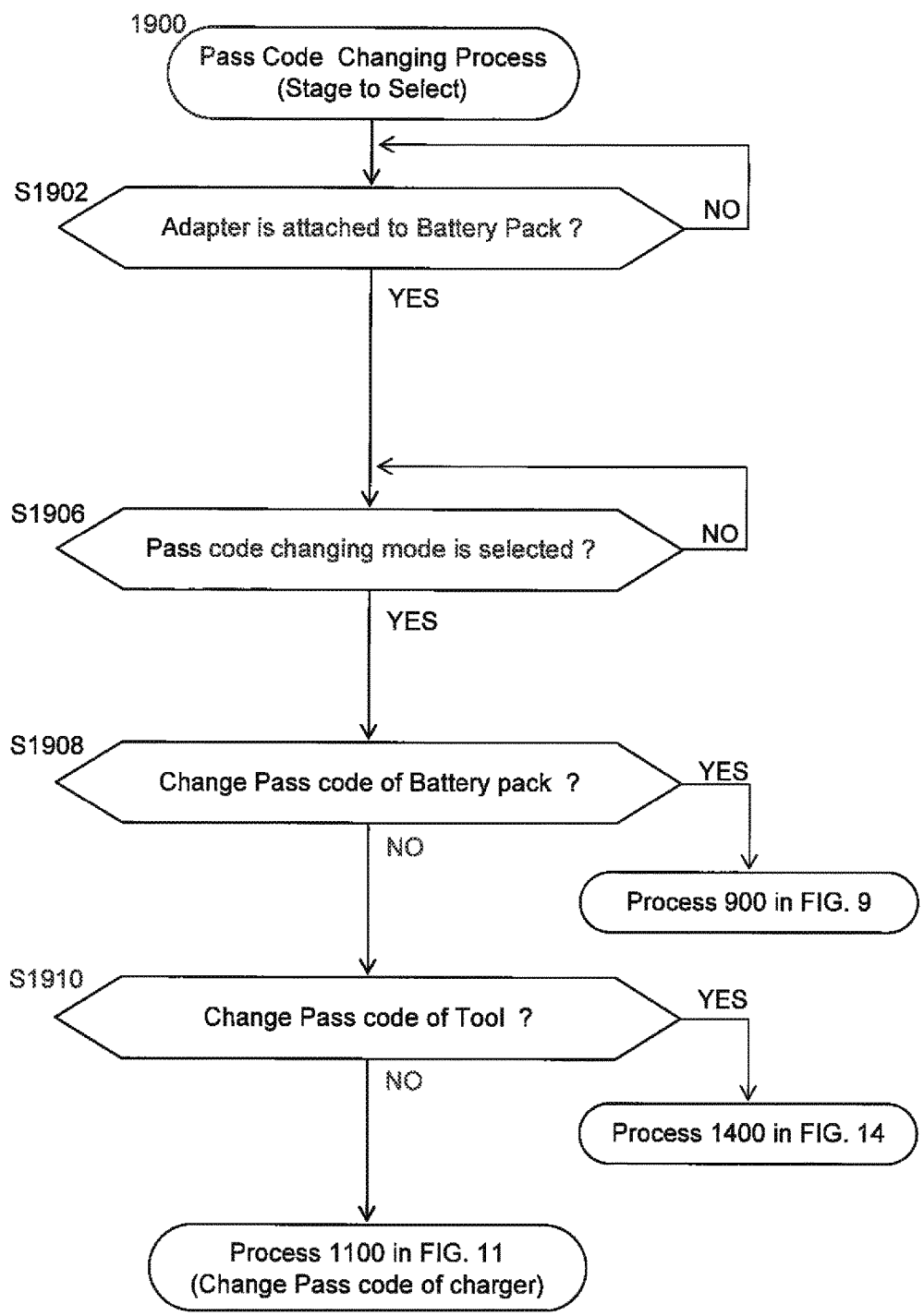

THEFT-DETERRENCE SYSTEM FOR POWER TOOL SYSTEM, AND ADAPTER AND METHOD THEREFOR

CROSS-REFERENCE

This application is the U.S. National Stage of International Application No. PCT/JP2012/004607 filed on Jul. 19, 2012, which claims priority to U.S. Provisional Application No. 61/511,092 filed on Jul. 24, 2011, No. 61/564,513 filed on Nov. 29, 2011, No. 61/578,231 filed on Dec. 20, 2011 and No. 61/593,533 filed on Feb. 1, 2012, the contents of all of which are hereby incorporated by reference as if fully set forth herein.

TECHNICAL FIELD

The present invention generally relates to power tools, e.g., hand-held power tools, which include theft prevention/deterrence functionality for the power tool and/or to a battery pack associated therewith, as well as to power tool systems containing the same, adapters for power tools that provide the theft prevention/deterrence functionality and methods of preventing/deterring theft of the power tools and/or battery packs associated therewith.

BACKGROUND

Several attempts have been made in the prior art to restrict usage of a power tool, e.g., a battery-operated, hand-held power tool, only to authorized users. The goal is to at least deter, if not prevent, the theft of the power tools and/or the battery packs associated with the power tools.

For example, the following proposals for solving this problem have been disclosed.

In US 2008/0238609 A1, a battery-operated electric hand tool device comprises control electronics, a wirelessly and contactlessly responding transceiver, and a storage unit in which an authorization code is stored. A locked mode of operation is distinguishable from a released mode of operation. In order to improve theft protection, a wire-bound or wireless interface is provided from the control electronics of the electric hand tool device to a battery pack such that locking data can be transmitted from the control electronics of the electric hand tool device to the battery pack, can be stored in a storage device of the battery pack, and can then be read out of the storage device again.

Similarly, in U.S. Pat. No. 6,872,121, an electrical hand tool device comprises control electronics and a transmitter and receiver, which operates in a wireless and contact-free manner, and a storage medium in which an authorization code is stored. An operation locking state can be differentiated from an operation release state. An external transmitter and receiver means is accommodated in a separate portable device. Communication with the transmitter and receiver means of the electrical hand tool device can be produced in a defined fashion by actuating the external transmitter and receiver means to change the operation state of the electrical hand tool. Communication is provided only to change the operation state and optionally to change the authorization code.

In JP 2004-181549 A, an electric tool has a mode changing means for switching between an ordinary operation mode and a tool unusable mode that prevents usage of the tool. An identification code storage means stores an identification code that is specific to the tool. An identification code input means is adapted to input the identification code. A control means is connected with these means and controls operation of the electric tool. When the control means determines that the identification code inputted via the identification input means coincides with the identification code stored in the identification code storage means, it changes the tool operational state from the tool unusable mode to the ordinary operation mode. When the inputted identification code is different from the stored identification code, use of the electric tool is prevented.

However, these known proposals suffer from one or more problems.

SUMMARY

It is an object of the present teachings to disclose a power tool system, an adapter for a power tool system and a method for preventing, or at least discouraging or deterring, the theft of a hand-held power tool and/or a battery (pack) therefor and/or a charger therefor.

In one aspect of the present teachings, a hand-held power tool and a battery (pack) are each provided with a pass code. The respective pass codes are directly compared at an appropriate timing, e.g., when the battery (pack) is attached to and/or otherwise electrically connected with the power tool. If the pass codes of the power tool and the battery pack do not match or otherwise correspond in a pre-defined manner, the power tool and/or the battery (pack) is disabled (i.e. the power tool can not be operated), even though the battery (pack) is attached to the power tool.

In addition or in the alternative, a charger for the battery (pack) may be provided with a pass code. The pass codes of the battery (pack) and the charger may be directly compared at an appropriate timing, e.g., when the battery (pack) is mounted on or otherwise electrically connected with the charger in order to recharge the battery. If the pass codes of the battery pack and the charger do not match or otherwise correspond in a pre-defined manner, the battery pack is prevented/prohibited from being charged, even though the battery pack is attached to the charger.

In preferred embodiments, the pass code(s) stored in the memory of the battery (pack) is (are) directly compared with the pass code(s) stored in the memory of the power tool or with the pass code(s) stored in the memory of the charger. Preferably, the battery (pack) has at least one controller that is adapted or configured to perform the pass code comparison and to generate either an enable signal (if the pass codes match) or a disable signal (if the pass codes do not match). However, the comparison may also be performed, in whole or in part, by a controller located in the power tool, in the charger, or in an adapter for the power tool system.

The term "pass code" as utilized herein is meant to be interchangeable with related terminology, such as "access code", "password", "PIN (personal identification number)", etc. Pass codes are intended to include any set of characters, letters, numbers, symbols, etc., which enable the hand-held power tool, battery (pack), charger and/or adapter to be identified, but need not be unique to each device.

In another aspect of the present teachings, techniques or methods for electronically locking a hand-held power tool, battery (pack) and/or charger are also disclosed. In one embodiment of this aspect, a user can electronically lock and unlock the battery pack by performing a predetermined operation. By electrically locking the battery pack and/or the power tool, the battery pack cannot power the power tool, even though the battery pack is attached to the power tool. Similarly, by electrically locking the battery pack and/or the charger, the charger can not recharge the battery pack, even though the battery pack is attached to the charger.

In another aspect of the present teachings, techniques or methods for setting or changing one or more pass code(s) stored in the battery pack, the power tool and/or the charger are disclosed. In certain embodiment thereof, the battery pack may be configured or adapted to act as a messenger by storing one or more pass codes when electrically coupled to one of the power tool and the charger and then, when subsequently electrically coupled to the other of the power tool and the charger, downloading the pass code(s) into the memory of the other device.

The following is a non-limiting summary of additional embodiments disclosed herein:

In a first embodiment, a power tool system comprises a hand-held power tool including a motor or a solenoid that drives a tool, and a first memory adapted or configured or adapted to store at least one pass code; a battery pack adapted or configured to be detachably attached to and power the power tool, the battery pack including a second memory adapted or configured or adapted to store at least one pass code; a first cut-off switch provided in one of the power tool and the battery pack, the first cut-off switch being adapted or configured to cut off the supply of current from the battery pack to the motor or solenoid when the first cut off switch is turned off; and a first controller provided in at least one of the power tool and the battery pack, the first controller being adapted or configured to: read the pass codes from the first and second memories when the battery pack is attached to the power tool, and turn off the first cut-off switch when the pass codes of the first memory and the second memory do not match or otherwise correspond in a predetermined manner.

According to the first embodiment, in case the power tool and/or the battery pack is (are) stolen, the stolen power tool or battery pack cannot be used together with other battery packs or power tools, which do not have matching or corresponding pass codes. Therefore, theft of the power tool or the battery pack is prevented or at least discouraged.

In a second embodiment, the power tool system as in the first embodiment is modified such that at least one of the first and second memories is adapted or configured to be capable of storing a plurality of pass codes, and the first controller is adapted or configured to turn off the first cut-off switch when no match is found between at least one pass code stored in the first memory and at least one pass code stored in the second memory.

According to the second embodiment, the battery pack can be commonly used with power tools having different pass codes. For example, two people may work together using power tools having such pass codes. Each person can store (e.g., temporarily) the other's pass code in his/her own power tool or battery pack as an additional pass code. Thus, the two people can commonly use their two or more battery packs with the other's charger(s) and/or power tool(s).

In a third embodiment, the power tool system as in the second embodiment is modified such that the plurality of pass codes includes a main (primary) pass code and at least one sub (secondary) pass code, and the main pass code is required in order to store, delete and/or rewrite the at least one sub pass code in the first memory and/or the second memory.

In the third embodiment, in which two people commonly use their two or more battery packs, each person should not tell his/her own main pass code to the other person in order to keep the main pass code as a secret. Thus, each person can set a sub pass code and inform the other person of the sub pass code, but then the sub pass code may be deleted as soon as the joint project is finished.

The power tool system may be configured or adapted such that the sub pass code permits the battery pack to be used with any charger and/or power tool that also contains the same sub pass code, but the sub pass code does not authorize any changes to the operating or locking parameters (e.g., re-setting the main pass code) of the other chargers and/or power tools.

In a fourth embodiment, the power tool system as in any preceding embodiment further comprises a charger adapted or configured to be detachably attached to and charge the battery pack, the charger including a third memory adapted or configured to store at least one pass code; a second cut-off switch provided in one of the battery pack and the charger, the second cut-off switch being adapted or configured to cut off the supply of current from the charger to the battery pack when the second cut off switch is turned off; and a second controller provided in at least one of the battery pack and the charger, the second controller being adapted or configured to read the pass codes from the second and third memories when the battery pack is attached to the charger, and to turn off the second cut-off switch when the pass codes of the second memory and the third memory do not match or otherwise correspond in a predetermined manner.

According to the fourth embodiment, the charger is also provided with the pass code. As a result, even if both the power tool and the battery pack are stolen, the stolen power tool and battery pack cannot be used after the charge stored in the battery pack has been depleted or dissipated, because the stolen battery pack cannot be charged by other chargers. That is, the battery pack can only be charged by a charger that contains an appropriate pass code stored therein.

In a fifth embodiment, the power tool system as in the fourth embodiment is modified such that at least one of the second and third memories is adapted or configured to be capable of storing a plurality of pass codes, and the second controller is adapted or configured to turn off the second cut-off switch when no match can be found between at least one pass code stored in one of the second memory and the third memory and the plurality of pass codes stored in the other of the second memory and the third memory.

According to the fifth embodiment, the charger can be commonly used with battery packs having different pass codes in a manner similar to the above-described second embodiment.

In a sixth embodiment, the power tool system as in the fifth embodiment is modified such that the plurality of pass codes includes a main (primary) pass code and at least one sub (secondary) pass code, and the main pass code is required in order to store, delete or rewrite the at least one sub pass code in the second memory and/or the third memory.

The sixth embodiment provides essentially the same advantages and features of the above-described third embodiment.

In a seventh embodiment, the power tool system as in any preceding embodiment further comprises a third controller provided in at least one of the power tool and the battery pack, wherein the third controller is adapted or configured to turn off the first cut-off switch when a predetermined condition is fulfilled.

The seventh embodiment provides an electronic lock function that disables the power tool and/or the battery pack when a predetermined condition has been fulfilled. For example, a user can electrically lock the power tool by performing a predetermined operation, e.g., by entering the pass code, when the user is not using the power tool. In this case, even if the power tool or battery pack is stolen, the stolen power tool or battery pack is prevented/blocked from being used, thereby preventing or discouraging the theft of the power tool and/or the battery pack.

In an eighth embodiment, the power tool system as in the seventh embodiment is modified such that the predetermined condition is at least one of:

a predetermined operation is performed by a user, a predetermined time has passed since the last activation of the power tool, the power tool has been activated a predetermined number of times, and/or the battery pack has been charged a predetermined number of times.

According to the eighth embodiment, a variety of possibilities are possible for defining the predetermined condition. In this embodiment, the predetermined operation may be, e.g., operating a trigger or an ON-OFF switch of the power tool a predetermined number of times (e.g., five times), entering the pass code, or any other appropriate operation.

In a ninth embodiment, the power tool system as in any preceding embodiment further comprises a (the) charger adapted or configured to be detachably attached to the battery pack, the charger having a user interface adapted or configured to receive a pass code inputted by a user; and a fourth controller at least partially provided in the battery pack, the fourth controller being adapted or configured to:

be coupled with the user interface when the battery pack is attached to the charger, receive a first pass code and a second pass code inputted via the user interface, and rewrite the current pass code stored in the second memory to the second pass code when the first pass code matches with the current pass code of the second memory.

The ninth embodiment relates to a technique and/or device for setting and/or changing the pass code(s). A user interface, e.g. numerical key pad and/or a display (e.g., a touch screen), may be advantageously utilized to set or change the pass codes. In order to minimize the size of the hand-held power tool and/or the battery pack, it is preferable to provide the user interface on or in the charger.

In a tenth embodiment, the power tool system as in any preceding embodiment further comprises a (the) charger adapted or configured to be detachably attached to the battery pack, the charger having a user interface adapted or configured to receive a pass code inputted by a user; and a fifth controller at least partially provided in the battery pack, the fifth controller being adapted or configured to:

be coupled with the user interface when the battery pack is attached to the charger, receive and store a third pass code and a fourth pass code inputted via the user interface while the battery pack is attached to the charger, be coupled with the first memory when the battery pack is attached to the power tool, and rewrite the current pass code stored in the first memory of the tool to the fourth pass code when the third pass code matches the current pass code of the first memory.

According to the tenth embodiment, the charger is attached only to the battery pack and is not attached to the power tool. Therefore, the pass code of the power tool cannot be changed directly via the user interface of the charger. In view of this configuration, this embodiment uses the battery pack like a messenger or conduit to change the pass code of the power tool. That is, the current pass code and a new pass code for the power tool are first stored in the battery pack while the battery pack is attached to the charger. Then, when the battery pack is attached to the power tool, the battery pack rewrites the pass code of the power tool.

In an eleventh embodiment, the power tool system as in the tenth embodiment is modified such that the fifth controller is further adapted or configured to:

receive a first pass code inputted via the user interface while the battery pack is attached to the charger, and perform an operation of receiving and storing of the third and fourth pass codes only when the inputted first pass code matches the pass code stored in the second memory of the battery pack.

In the eleventh embodiment, only a user who knows the pass code, e.g., the main pass code, of the battery pack can use the battery pack as a messenger.

In a twelfth embodiment, the power tool system as in any preceding embodiment further comprises a (the) charger adapted or configured to be detachably attached to the battery pack, the charger including a third memory adapted or configured to store at least one pass code and a user interface configure to receive a pass code inputted by a user; and a sixth controller at least partially provided in the battery pack, the sixth controller being adapted or configured to:

be coupled with the user interface and the third memory of the charger respectively when the battery pack is attached to the charger, receive and store a fifth pass code and a sixth pass code inputted via the user interface while the battery pack is attached to the charger, and rewrite the current pass code stored in the third memory of the charger to the sixth pass code when the fifth pass code matches the current pass code of the third memory.

In a thirteenth embodiment, the power tool system as in the twelfth embodiment is modified such that the sixth controller is further adapted or configured to:

receive a first pass code inputted via the user interface while the battery pack is attached to the charger, and perform an operation of receiving and storing of the fifth and
sixth pass codes only when the inputted first pass code
matches the pass code stored in the second memory of the
battery pack.

As will be described below, an adapter having a user interface may be employed in this embodiment to set or change the pass codes. In such embodiments, the user interface may be a data input device, such as an alphanumeric keypad and/or display (e.g., a touch screen). Or, the user interface may be a wireless transceiver adapted or configured to wirelessly communicate with an external device, which comprises the data input device, such as an alphanumeric keypad and/or display (e.g., a touch screen). The wireless communication protocol is not particularly limited, but technologies based upon radio waves (e.g., Bluetooth(registered)) and infrared waves are preferred.

Such an adapter may be adapted or configured to attach to at least one of: (i) the charger according to the below-described fourteenth to eighteenth embodiments, (ii) the power tool according the below-described nineteenth to twenty-third embodiments and/or (iii) the battery pack according to the below-described twenty-fourth to twenty-eight embodiments.

In one representative embodiment, the adapter may comprise a wireless communication adapter (which may not include a manual input device, e.g., a keyboard) attached to the power tool. The external device may be a mobile terminal device (e.g., a smart phone) wirelessly communicating with the adapter. The battery pack also may serve as a messenger in the embodiments that utilize an adapter.

In the fourteenth embodiment, the power tool system as in any preceding embodiment further comprises a (the) charger adapted or configured to be detachably attached to the battery pack; an (the) adapter adapted or configured to be detachably attached to the charger, the adapter including a user interface adapted or configured to receive a pass code inputted by a user; and a fourth controller at least partially provided in the battery pack, the fourth controller being adapted or configured to:

be coupled with the user interface when the battery pack and the adapter are attached to the charger, receive a first pass code and a second pass code inputted via the user interface, and rewrite the current pass code stored in the second memory of the battery pack to the second pass code when the first pass code matches the current pass code of the second memory.

In the fifteenth embodiment, the power tool system as in any preceding embodiment further comprises a (the) charger adapted or configured to be detachably attached to the battery pack; an (the) adapter adapted or configured to be detachably attached to the charger, the adapter including a user interface adapted or configured to receive a pass code inputted by a user; and a fifth controller at least partially provided in the battery pack, the fifth controller being adapted or configured to:

be coupled with the user interface when the battery pack and the adapter are attached to the charger, receive and store a third pass code and a fourth pass code inputted via the user interface while the battery pack is attached to the charger, be coupled with the first memory when the battery pack is attached to the power tool, and rewrite the current pass code stored in the first memory of the tool to the fourth pass code when the third pass code matches the current pass code of the first memory.

In the sixteenth embodiment, the power tool system as in the fifteenth embodiment is modified such that the fifth controller is further adapted or configured to:

receive a first pass code inputted to the user interface while the battery pack and the adapter are attached to the charger, and perform an operation of receiving and storing the third and fourth pass codes only when the inputted first pass code matches the pass code stored in the second memory of the battery pack.

In the seventeenth embodiment, a power tool system as in any preceding embodiment further comprises a (the) charger adapted or configured to be detachably attached to the battery pack, the charger including a third memory adapted or configured or adapted to store at least one pass code; an (the) adapter adapted or configured to be detachably attached to the charger, the adapter including a user interface adapted or configured to receive a pass code inputted by a user; and a sixth controller at least partially provided in the battery pack, the sixth controller being adapted or configured to:

be coupled with the user interface and the third memory of the charger respectively when the battery pack and the adapter are attached to the charger, receive and store a fifth pass code and a sixth pass code inputted via the user interface while the battery pack and the adapter are attached to the charger, and rewrite the current pass code stored in the third memory of the charger to the sixth code when the fifth pass code matches the current pass code of the third memory.

In the eighteenth embodiment, the power tool system as in the seventeenth embodiment is modified such that the sixth controller is further adapted or configured to:

receive a first pass code inputted to the user interface while the battery pack and the adapter are attached to the charger, and perform an operation of the receiving and storing of the fifth and sixth pass codes only when the inputted first pass code matches the pass code stored in the second memory of the battery pack.

As was noted above, in the below-described nineteenth to twenty-third embodiments, the adapter is adapted or configured to be attached to the power tool.

In the nineteenth embodiment, the power tool system as in any preceding embodiment further comprises an (the) adapter adapted or configured to be detachably attached to the power tool, the adapter including a user interface adapted or configured to receive a pass code inputted by a user; and a fourth controller at least partially provided in the battery pack, the fourth controller being adapted or configured to:

be coupled with the user interface when the battery pack and the adapter are attached to the tool, receive a first pass code and a second pass code inputted via the user interface, and rewrite the current pass code stored in the second memory of the battery pack to the second pass code when the first pass code matches the current pass code of the second memory.

In the twentieth embodiment, the power tool system as in any preceding embodiment further comprises an (the) adapter adapted or configured to be detachably attached to the power tool, the adapter including a user interface adapted or configured to receive a pass code inputted by a user; and a fifth controller at least partially provided in the battery pack, the fifth controller being adapted or configured to:

be coupled with the user interface when the battery pack and the adapter are attached to the tool, receive and store a third pass code and a fourth pass code inputted via the user interface, and rewrite the current pass code stored in the first memory of the tool to the fourth pass code when the third pass code matches the current pass code of the first memory.

In the twenty-first embodiment, the power tool system as in the twentieth embodiment is modified such that the fifth controller is further adapted or configured to:

receive a first pass code inputted to the user interface while the battery pack and the adapter are attached to the tool, and perform an operation of receiving and storing the third and fourth pass codes only when the inputted first pass code matches the pass code stored in the second memory of the battery pack.

In the twenty-second embodiment, the power tool system as in any preceding embodiment further comprises a (the) charger adapted or configured to be detachably attached to the battery pack, the charger including a third memory adapted or configured or adapted to store at least one pass code; an (the) adapter adapted or configured to be detachably attached to the power tool, the adapter including a user interface adapted or configured to receive a pass code inputted by a user; and a sixth controller at least partially provided in the battery pack, the sixth controller being adapted or configured to:

be coupled with the user interface when the battery pack and the adapter are attached to the tool, receive and store a fifth pass code and a sixth pass code inputted via the user interface while the battery pack and the adapter are attached to the tool, be coupled with the third memory of the charger when the battery pack is attached to the charger, and rewrite the current pass code stored in the third memory of the charger to the sixth code when the fifth pass code matches the current pass code of the third memory.

In the twenty-third embodiment, the power tool system as in the twenty-second embodiment is modified such that the sixth controller is further adapted or configured to:

receive a first pass code inputted to the user interface while the battery pack and the adapter are attached to the tool, and perform an operation of receiving and storing the fifth and sixth pass codes only when the inputted first pass code matches the pass code stored in the second memory of the battery pack.

As was noted above, in the below-described twenty-fourth to twenty-eighth embodiments, the adapter is adapted or configured to be attached to the battery pack.

In the twenty-fourth embodiment, the power tool system as in any preceding embodiment further comprises an (the) adapter adapted or configured to be detachably attached to the battery pack, the adapter including a user interface adapted or configured to receive a pass code inputted by a user; and a fourth controller at least partly provided in the battery pack, the fourth controller being adapted or configured to:

be coupled with the user interface when the adapter is attached to the battery pack, receive a first pass code and a second pass code inputted via the user interface, and rewrite the current pass code stored in the second memory of the battery pack to the second pass code when the first pass code matches the current pass code of the second memory.

In the twenty-fifth embodiment, the power tool system as in any preceding embodiment further comprises an adapter adapted or configured to be detachably attached to the battery pack, the adapter including a user interface adapted or configured to receive a pass code inputted by a user, and a fifth controller at least partially provided in the battery pack, the fifth controller being adapted or configured to:

be coupled with the user interface when the adapter is attached to the battery pack, receive and store a third pass code and a fourth pass code inputted via the user interface, be coupled with the first memory of the tool when the battery pack is attached to the tool, and rewrite the current pass code stored in the first memory of the tool to the fourth pass code when the third pass code matches the current pass code of the first memory.

In the twenty-sixth embodiment, the power tool system as in the twenty-fifth embodiment is modified such that the fifth controller is further adapted or configured to:

receive a first pass code inputted to the user interface while the adapter is attached to the battery pack, and perform an operation of receiving and storing the third and fourth pass codes only when the inputted first pass code matches the pass code stored in the second memory of the battery pack.

In the twenty-seventh embodiment, the power tool system as in any preceding embodiment further comprises a (the) charger adapted or configured to be detachably attached to the battery pack, the charger including a third memory adapted or configured or adapted to store at least one pass code; an (the) adapter adapted or configured to be detachably attached to the battery pack, the adapter including a user interface adapted or configured to receive a pass code inputted by a user; and a sixth controller at least partially provided in the battery pack, the sixth controller being adapted or configured to:

be coupled with the user interface when the adapter is attached to the battery pack, receive and store a fifth pass code and a sixth pass code inputted via the user interface while the adapter is attached to the battery pack, be coupled with the third memory of the charger when the battery pack is attached to the charger, and rewrite the current pass code stored in the third memory of the charger to the sixth code when the fifth pass code matches the current pass code of the third memory.

In the twenty-eighth embodiment, the power tool system as in the twenty-seventh embodiment is modified such that the sixth controller is further adapted or configured to:

receive a first pass code inputted via the user interface while the adapter is attached to the battery pack, and perform an operation of receiving and storing the fifth and sixth pass codes only when the inputted first pass code matches the pass code stored in the second memory of the battery pack.

The terms "first controller", "second controller", "third controller", etc. used herein may be understood as encompassing embodiments, in which each controller is separate and unique controller, as well as embodiments, in which the functions of two or more "first", "second", "third", etc. controllers are implemented in a single controller device.

That is, in the latter embodiments, the usage of the numerical identifier "first", "second", "third", etc. is only intended to correspond to a particular function or set of functions associated therein and is not intended to imply that such function(s) must be implemented using a plurality of controllers.

In another aspect of the present teachings, any of the above-described adapters preferably include, in addition or in the alternative to the any of the following circuitry or functionality, means for wirelessly communicating with an external device, e.g., an external device that comprises a data input device, a controller (computing means, microprocessor(s), etc.) and/or a display, such as a smart phone. Such adapters are adapted or configured to provide an anti-theft function or key.

For example, one or more of the power tool, the battery pack and the battery charger may include an electronic lock, i.e. a device that prevents or blocks operation of the power tool and/or the battery pack and/or the charger when a "key", e.g., pass code or a password, e.g., an encrypted password, is not received by the electronic lock. The adapter may include communication means for communicating the necessary key to the electronic lock in order to enable and/or disable usage of the power tool and/or battery pack.

For example, the external device, which may be a computer or server connected to a wireless access point (e.g., a wireless router) located at a manufacturing facility or a construction site, may wirelessly broadcast the key in the vicinity of the worksite. When the adapter receives the key, the adapter communicates the key to the power tool and/or battery pack, thereby enabling usage thereof. The power tool and/or battery pack may be configured to operate for a certain amount of time, e.g., one hour, one day, etc., after receiving the key and to then require the key to be re-input again within the certain period of time in order to continue uninterrupted operation of the power tool and/or battery pack. If the key is not timely received, the electronic lock may internally shut off operation of the power tool and/or battery pack in a manner that can not be overridden unless the adapter, battery pack or power tool is brought into communication with the external device again. Such an embodiment provides a theft-deterrence, because the power tool and/or battery pack can only be used at a worksite where the key is being broadcast.

The "external device" according to the present teachings is not particularly limited, as long as it comprises a means for communicating, e.g., wirelessly, with the adapter. The external device may generally comprise circuitry adapted or configured to analyze and/or display information transmitted from the adapter to the external device and/or to transmit information from the external device to the adapter for use by the battery pack or power tool. The external device may be "dumb" in that it basically only comprises the communication means and the display, such that the external device merely displays the information calculated or generated by the adapter. Or, the external device may be "smart" in that comprises the communication means and at least one controller, e.g., one or more microprocessors and one or more memory and/or storage devices, such that the external device is capable of processing and/or analyzing data received from the adapter, as well as generating data and/or instructions to be transmitted to the battery pack and/or power tool via the adapter. The external device may directly communicate the information to the user, e.g., via a display, or may further communicate the information to another external device that serves as an (another) interface with the user.

For example, the external device may be a hand-held or portable device, such as a mobile telephone (e.g., a "smart phone"), a personal data assistant (PDA), a tablet computer, a portable (laptop) computer, a dedicated portable electronic device, etc., or it may be a device intended to remain in a fixed location, such as a personal (desktop) computer, a server or a mainframe.

In the alternative, the external device may be "dumb", such as a dedicated display/input device or a phone that is not itself capable of executing programs for operating the adapter, battery pack or power tool. For example, the adapter could be configured to send a text (SMS) message or email message to the phone. Or, the adapter may be configured to send information for display on the dedicated display/input device and to receive information/instructions that are input at the dedicated display/input device.

Naturally, other possibilities for communicating the key to the power tool and/or battery pack via the adapter are possible, such as wired connections. In such an embodiment, the adapter may be directly connected to the external device in order to enable usage of the adapter and/or to communicate the key to the adapter. In this case, the adapter would be required to be physically proximal to the external device or to at least an interface of the external device in order to obtain the necessary key.

The wireless communication protocol for communication between the adapter and the external device is not particularly limited according to the present teachings and may be one or more of a wireless local area network (WLAN) device, e.g., a WiFi network interface controller or access point (i.e. operating according to the wireless communication protocol specified by IEEE 802.11), a Bluetooth(registered) communication device, cordless telephony or cellular (mobile) network devices, radio (RF) communication devices or any other type of known or future-developed wireless communication technology.

In another aspect of the present teachings, the adapter may comprise means for detachably connecting to only the power tool, a controller, such as at least one microprocessor, at least one memory or storage device in communication with the controller, and at least one communication port configured to electrically communicate with a controller, such as at least one microprocessor, located in the power tool.

In this aspect, when a battery pack is connected to the power tool, which battery pack includes a controller, such as at least one microprocessor, a communication path is established such that the battery pack controller communicates with the adapter controller via the power tool controller.

In another aspect of the present teachings, the adapter may comprise means for detachably connecting to only the battery pack, a controller, such as at least one microprocessor, at least one memory or storage device in communication with the controller, and at least one communication port configured to electrically communicate with a controller, such as at least one microprocessor, located in the battery pack.

In this aspect, when a battery pack is connected to the power tool, which power tool includes a controller, such as at least one microprocessor, a communication path is established such that the power tool controller communicates with the adapter controller via the battery pack controller.

In such an arrangement, the adapter is not required to contain wiring for conducting current between the battery pack and the power tool, thereby minimizing space and manufacturing requirements. In addition or in the alternative, the adapter can be adapted or configured to be more firmly or fixedly attached to the power tool than conventional adapters, so that the adapter will not be readily dislodged from the power tool during operation.

In a preferred embodiment of this aspect of the present teachings, each of the battery pack, power tool and adapter preferably comprises at least one controller, such as at least one microprocessor or microcontroller. In this case, the adapter controller(s) preferably communicates with the battery pack controller(s) via the power tool controller(s) and thus the adapter controller(s) indirectly communicate(s) with the battery pack controller(s).

In another aspect of the present teachings, the adapter may comprise first means for detachably connecting to the battery pack, second means for detachably connecting to the power tool, a controller, such as at least one microprocessor, at least one memory or storage device in communication with the controller, at least one first communication port configured to electrically communicate with a controller, such as at least one microprocessor, located in the battery pack, and at least one second communication port configured to electrically communicate with a controller, such as at least one microprocessor, located in the power tool.

In this aspect, when the adapter is connected to the battery pack and to the power tool, a communication path is established such that the battery pack controller communicates with the adapter controller and the adapter controller communicates with the power tool controller.

In another preferred embodiment of this aspect of the present teachings, the adapter according to any preceding embodiment or aspect may be provided without the power tool and/or the battery pack.

In another aspect of the present teachings, the power tool and/or the battery pack may include one or more of such wireless communication means, in which case the adapter may be omitted, such that the external device communicates directly with the battery pack and/or the power tool.

The electronic lock may also be referred to interchangeably as an electronically-actuated lock.

Further objects, advantages, features, embodiments and details of the invention will be readily understood by the skilled person upon reading the following detailed description and claims in view of the appended drawings.

BRIEF DESCRIPTION OF DRAWINGS

FIG. 19 shows a flowchart of a representative, non-limiting process for changing the pass code(s) of the battery pack, the power tool and the charger of the fourth embodiment.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved power tools, battery packs, adapters and/or chargers, as well as methods for making and using the same.

Moreover, combinations of features and steps disclosed in the following detail description may not be necessary to practice the invention in the broadest sense, and are instead taught merely to particularly describe representative examples of the invention. Furthermore, various features of the above-described aspects and embodiments and the below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
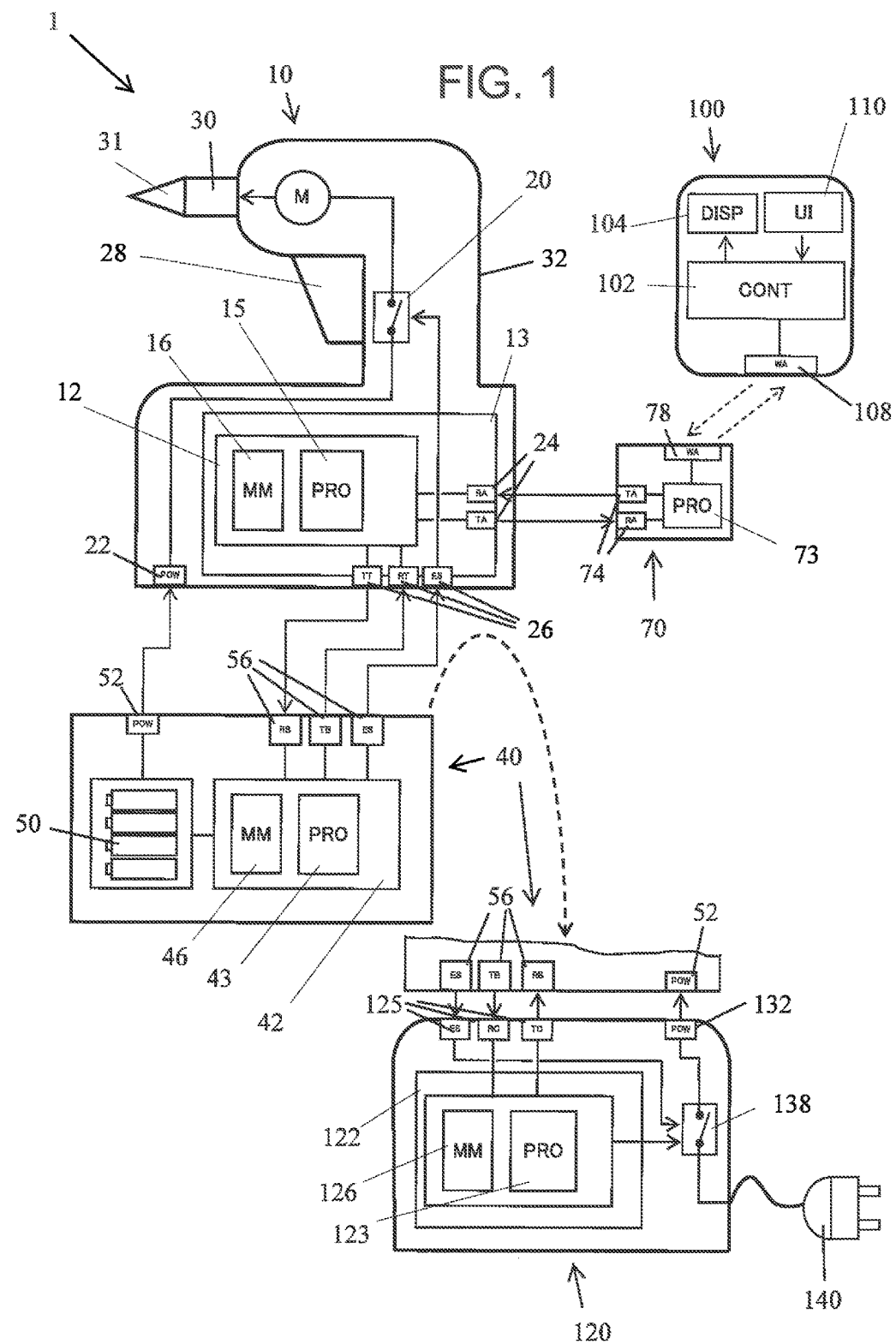
FIG. 1 shows a schematic block diagram of a first embodiment of a power tool system according to the present teachings.

FIG. 1 shows a schematic block diagram of a first embodiment of a power tool system 1 according to the present teachings. The power tool system 1 may generally comprise a hand-held power tool 10, a battery pack 40, a charger 120, and an adapter 70, although the charger 120 and adapter 70 may be optional in certain embodiments of the present teachings.

The hand-held power tool 10 is provided with an electric motor 10 or a solenoid that drives a tool, e.g., a chuck 30 having a tool bit 31 mounted therein. A cut-off switch 20 is disposed in a circuit that supplies driving current to the motor M. The cut-off switch 20 may be, but is not limited to, a semiconductor switch, e.g., one or more FET(s), e.g., one or more power FET(s). The cut-off switch 20 may also be configured or adapted to supply current to the motor M or solenoid according to pulse-width modulation techniques in order to control the rotational speed and/or torque applied to the tool, as is well known in the art.

The hand-held power tool 10 further comprises a circuit board 13 including a tool controller 12, such as one or more processors, microprocessors, state machines, digital logic, etc. In the present embodiment, the tool controller 12 comprises at least one processor 13 and at least one tool memory 16. The tool memory 16 stores programs and data for the processor(s) 13. The tool controller 12 is adapted or configured to turn ON and OFF the cut-off switch 20 according to the user's operation/actuation of a trigger switch 28.

The battery pack 40 is adapted or configured to be detachably attached to the hand-held power tool 10. The battery pack 40 includes a plurality of rechargeable battery cells 50, e.g., lithium-ion cells. The battery pack 40 is adapted or configured to supply current to the hand-held power tool 10 when the battery pack 40 is attached to the hand-held power tool 10. The battery pack 40 further comprises at least battery pack controller 42, such as one or more processors, microprocessors, state machines, digital logic, etc. In the present embodiment, the battery pack controller 42 comprises at least one processor 43 and at least one battery pack memory 46. The battery pack memory 46 stores programs and data for the processor(s) 43.

When the battery pack 40 is attached to the hand-held power tool 10, the battery pack controller 42 communicates with the tool controller 12 so that the battery pack controller 42 accesses the tool memory 16 to read and write data therein. In addition, in the present embodiment, the battery pack controller 42 is electrically connected to the cut-off switch 20 without passing through the tool controller 12 such that the battery controller 42 directly controls the cut-off switch 20 of the hand-held power tool 10. However, the cut-off switch 20 may be entirely controlled by the tool controller 12, such that the battery controller 42 outputs tool disable/enable signals to the tool controller 12.

The charger 120 is adapted or configured to be detachably attached to the battery pack 40 and to charge the battery pack 40 when it is attached thereto. A cut-off switch 138 is disposed in a circuit that supplies charging current to the battery pack 40. The charger 120 further comprises at least one charger controller 122, such as one or more processors, microprocessors, state machines, digital logic, etc. In the present embodiment, the charger controller 122 comprises at least one processor 123 and at least one charger memory 126. The charger memory 126 stores programs and data for the processor(s) 123. The charger controller 122 is adapted or configured to turn ON and OFF the cut-off switch 138 according to one or more charging program(s) and data.

When the battery pack 40 is attached to the charger 120, the battery pack controller 42 communicates with the charger controller 122 so that the battery pack controller 42 can access the charger memory 126 to read and write data therein. In addition, the battery controller 42 may be electrically connected to the cut-off switch 138 of the charger 120 without passing through the charger controller 122 such that the battery controller 42 directly controls the cut-off switch 138 of the charger 120. Although it is again possible for the battery controller 42 to output charger disable/enable signals to the charger controller 122 in order to determine whether the cut-off switch 138 is activated or de-activated.

The adapter 70 is adapted or configured to be detachably attached to the hand-held power tool 10, preferably only to the hand-held power tool 10 (i.e. the adapter 70 does not physically engage the battery pack 40, although the adapter 70 may contact the battery pack 40). In the present embodiment, the adapter 70 is a communication adapter that is capable of wireless communication with an external device 100, such as mobile or portable device, e.g., a smart phone, personal data assistant, tablet computer, etc.

Mobile devices 100 according to this embodiment of the present teachings may generally include at least one user interface 110, such as an alphanumeric keypad, a display 104 (which may be combined with the user interface 100, each as a touch screen) and at least one processor 102. A not-shown memory may also be included in the mobile device 100. In this embodiment, the mobile device 100 serves as the user interface for the adapter 70 and for the power tool system 1.

Figure 2:
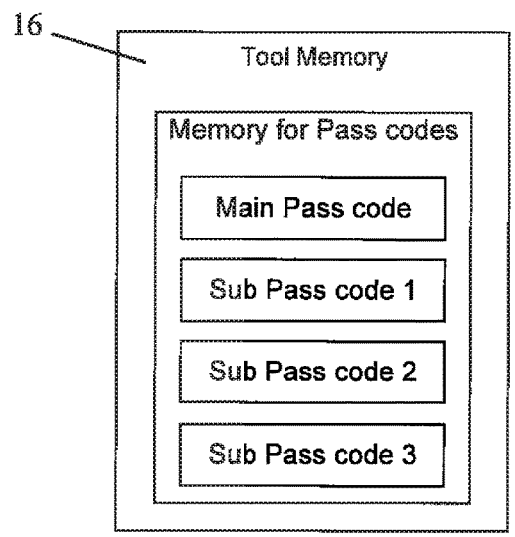
FIGS. 2 to 4 respectively show a tool memory, a charger memory and a battery pack memory of the first embodiment.
Figure 3:
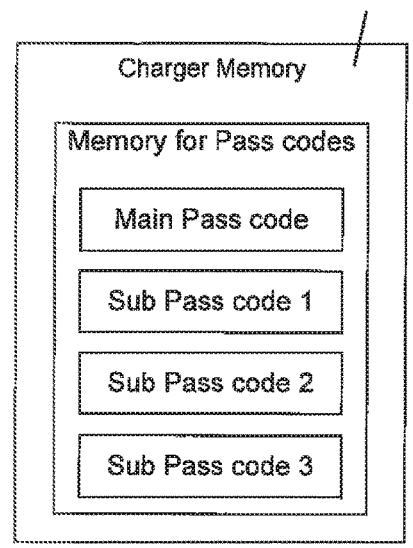
Figure 4:
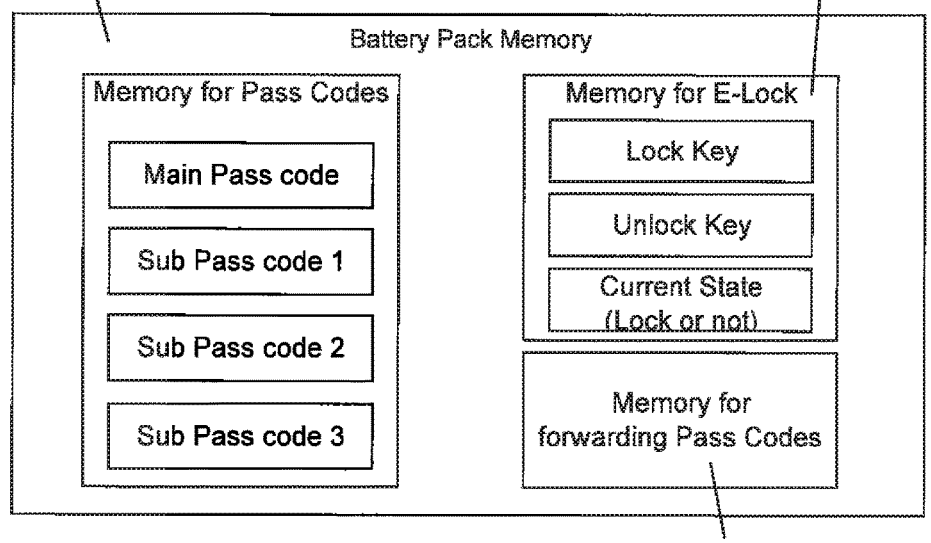

FIGS. 2 to 4 respectively show the tool memory 16, the charger memory 126 and the battery pack memory 46. Each memory 16, 46, 126 comprises at least one pass code memory that stores a main (primary) pass code and a plurality of sub (secondary) pass codes. As will be described below, the main and sub pass codes can be set and changed by the user or a tool administrator.

Preferably, the battery pack memory 46 also further comprises a lock memory 47 for an electronic lock function and a forwarding memory 49 for forwarding pass codes. The lock memory 47 stores, e.g., lock key data, unlock key data and current state data. The lock key data includes at least one condition to be satisfied in order to electronically lock (i.e. disable) the battery pack 40 and/or the power tool 10 and/or the charger 120. The unlock key data includes at least one condition to be satisfied in order to electronically unlock (i.e. release the lock of) the battery pack 40 and/or the power tool 10 and/or the charger 120, thereby enabling usage of the battery pack 40 and/or the power tool 10 and/or the charger 120.

The conditions for electronically locking and unlocking each may be or include a particular operation/actuation pattern of the trigger 28, a period of time during which the battery pack 40 is not used, or the inputting of the main or sub pass code. The current state data includes information concerning whether the battery pack 40 is currently in a locked (disabled) or unlocked (enabled) state. The forwarding memory 49 stores pass codes to be forwarded to the power tool 10 or the charger 120, as will be discussed further below.

The lock memory and forwarding memory could, in the alternative, be provided in the power tool memory 16 and/or in the charger memory 126 and/or in an adapter memory.

Figure 5:
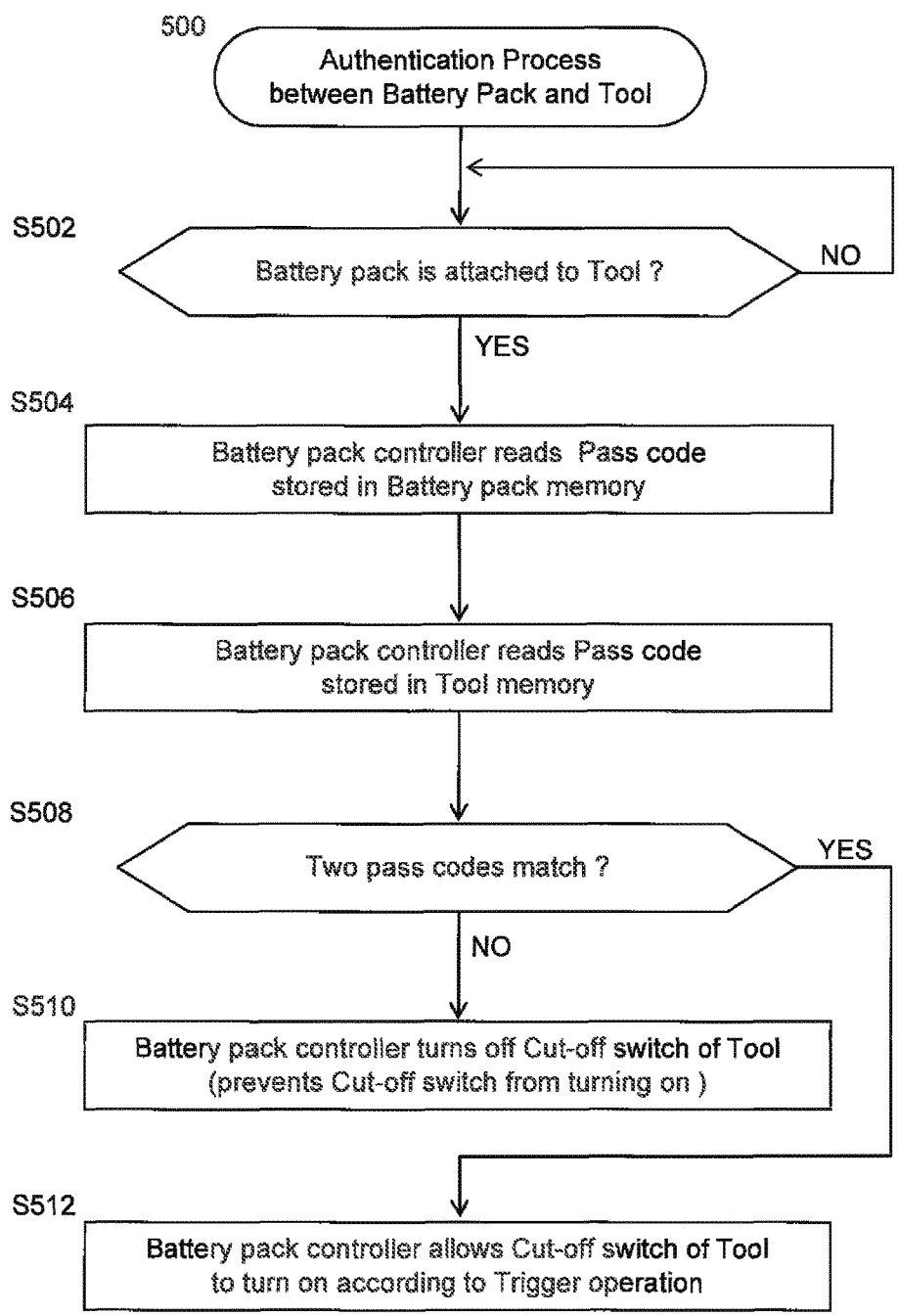
FIG. 5 shows a flowchart of a representative, non-limiting authentication process that may be performed between a battery pack and a hand-held power tool.

FIG. 5 shows a flowchart of a representative, non-limiting authentication process 500 that may be performed between the battery pack 40 and the hand-held power tool 10. As will be further described below, the battery pack 40 is adapted or configured to power (supply current to) the hand-held power tool 10 only when at least one pass code of the battery pack 40 matches at least one pass code of the hand-held power tool 10. That is, no power (current) will be supplied if a match can not be found.

When the battery pack 40 is attached to the hand-held power tool 10 (YES in S502), the battery pack controller 42 reads the pass codes stored in the battery pack memory 46 in step S504. Then, in step S506, the battery pack controller 42 accesses the tool memory 16 and reads the pass codes stored therein. The battery pack controller 42 then verifies whether at least one pass code of the hand-held power tool 10 matches at least one pass code of the battery pack 40 in step S508 by performing a direct comparison of the pass codes stored in the tool memory 16 with the pass codes stored in the battery pack 40.

If the determination is YES in step S508, the battery pack controller 42 allows or causes the cut-off switch 20 of the hand-held power tool 10 to be turned/switched ON when the user operates (e.g., squeezes) the trigger 28 in step S512.

On the other hand, if the determination is NO in step S508, the battery pack controller 42 prevents or blocks (disables) the cut-off switch 20 from being turned ON in step S510 even if the user activates/actuates the trigger 28.

According to this authentication process 500, in case the battery pack 40 is stolen, the stolen battery pack 40 is prevented or blocked from being used with a power tool that does not contain the required pass code(s) that enable(s) operation of the battery pack 40, thereby at least reducing the incentive to steal the battery pack 40 and attempt to use it with other power tools.

Figure 6:
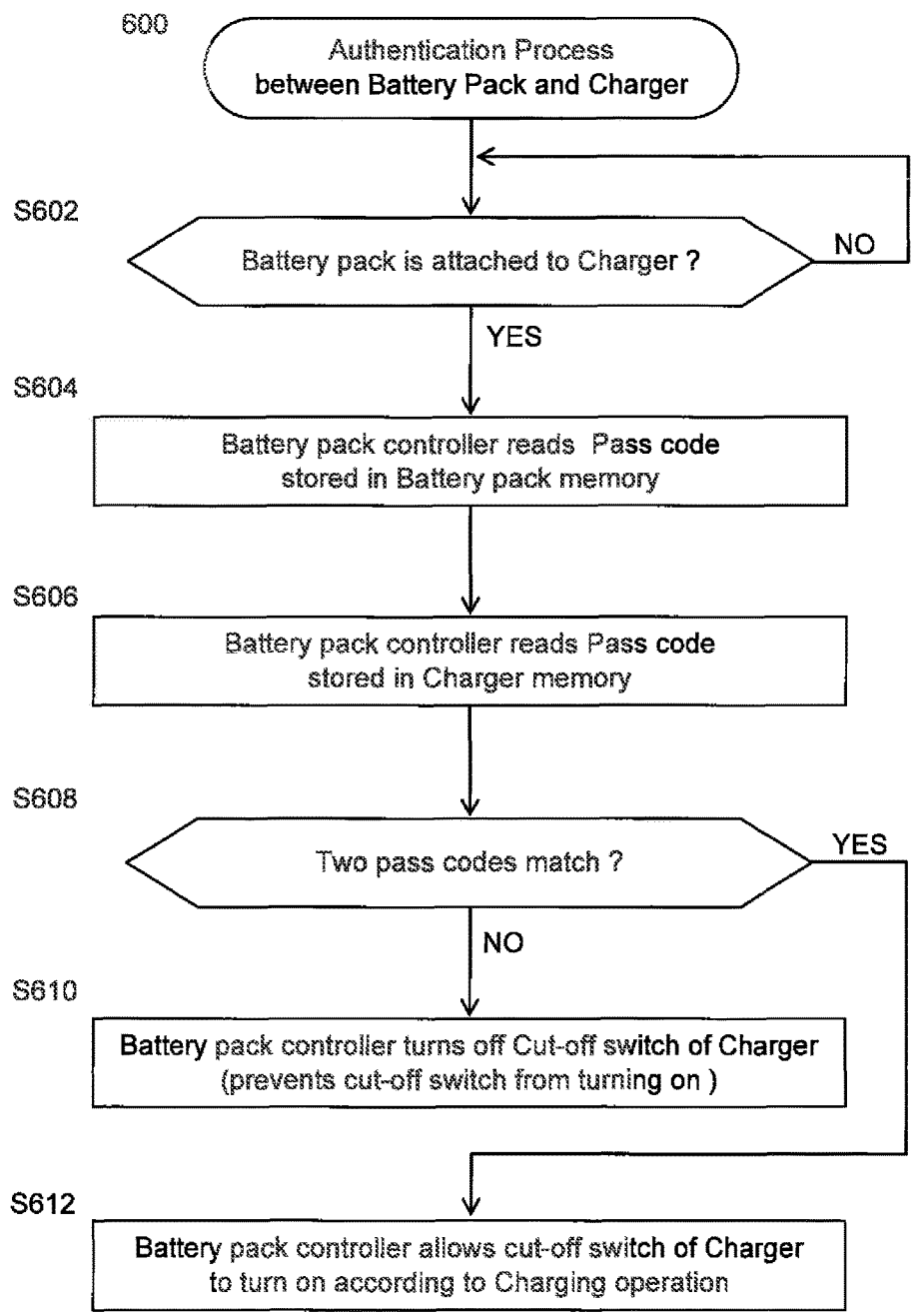
FIG. 6 shows a flowchart of a representative, non-limiting authentication process that may be performed between the battery pack and a charger.

FIG. 6 shows a flowchart of a representative, non-limiting authentication process 600 that may be performed between the battery pack 40 and the charger 120. As will be described below, the battery pack 40 is adapted or configured to be charged only when at least one pass code of the battery pack 40 matches at least one pass code of the charger 120.

When the battery pack 40 is attached to the charger 120 (YES in S602), the battery pack controller 42 reads the pass codes stored in the battery pack memory 46 in step S604. Then, in step S606, the battery pack controller 42 accesses the charger memory 126 and reads the pass codes stored therein. The battery pack controller 42 verifies whether at least one pass code of the battery pack 40 matches at least one pass code of the charger 120 in step S608 by performing a direct comparison of the pass codes stored in the charger memory 126 with the pass codes stored in the battery pack 40.

If the determination is YES in step S608, the battery pack controller 42 allows or causes the cut-off switch 138 of the charger 120 to be turned ON in step S612 in accordance with a charging operation performed by the charger controller 122.

On the other hand, if the determination is NO in step S608, the battery pack controller 42 prevents the cut-off switch 138 from being turned ON, such that the charging operation will not be initiated in step S610, i.e. charging of the battery pack 40 will be blocked. Therefore, in case both the power tool 10 and battery pack 40 are stolen, the stolen battery pack 40 is prevented from being further used after the charge in the battery pack 40 has been depleted, because it can not be recharged by an unauthorized charger, i.e. a charger that does not contain the necessary pass code(s).

Figure 7:
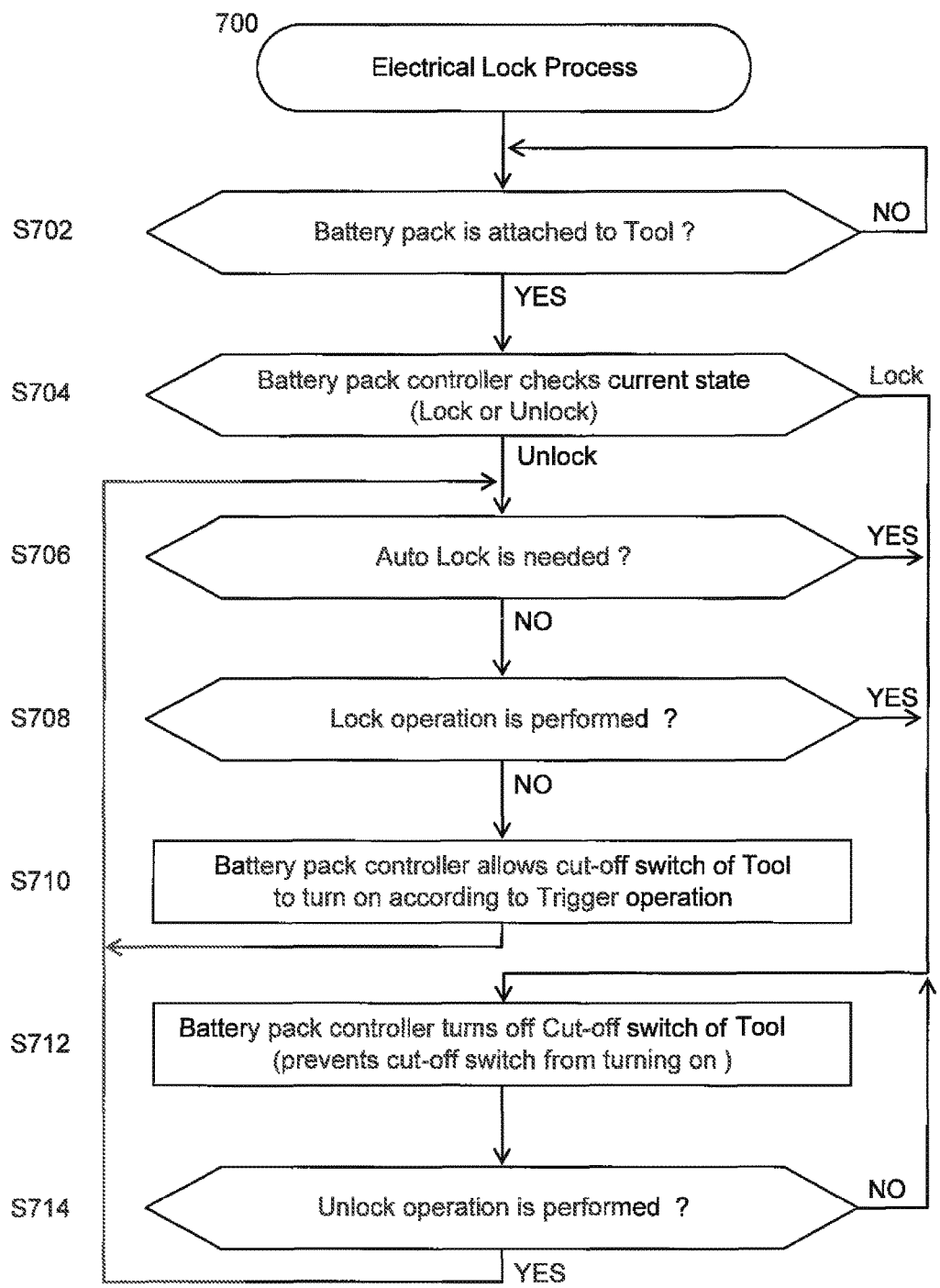
FIG. 7 shows a flowchart of a representative, non-limiting electronic lock process.
Figure 8:
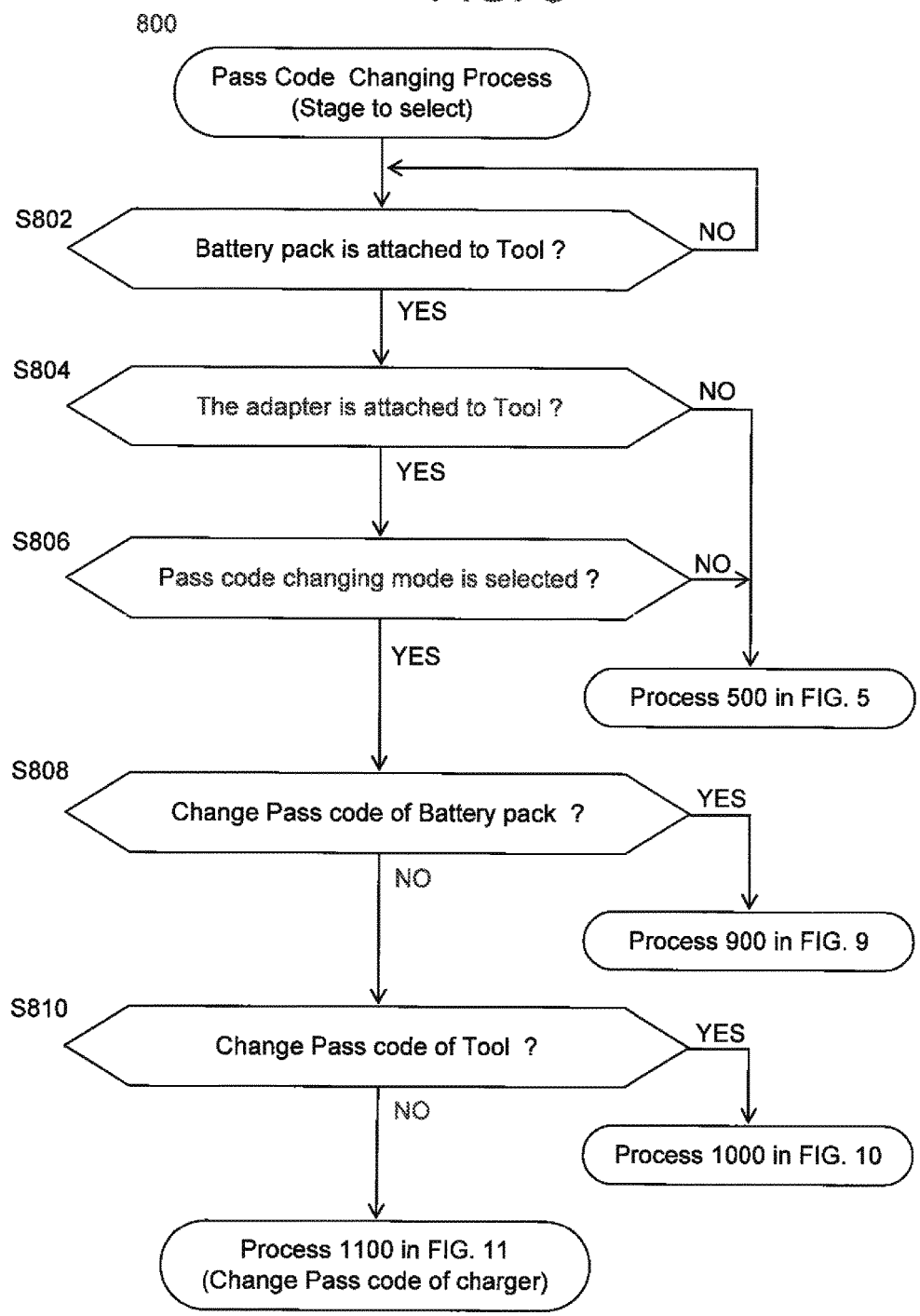
FIGS. 8-11 respectively show flowcharts of representative, non-limiting processes for changing the pass code(s) of the battery pack, the power tool and the charger.

FIG. 7 shows a flowchart of a representative, non-limiting electronic lock process 700. As will be described below, the battery pack 40 is adapted or configured to be electrically locked and unlocked by the user or a tool administrator.

When the battery pack 40 is attached to the power tool 10 (YES in S702), the battery pack controller 42 checks the lock memory 47 in step S704 to determine whether the battery pack 40 is currently locked or not. If the battery pack 40 is currently electrically locked, the battery controller 42 goes to step S712 and prevents/blocks the cut-off switch 20 of the power tool 10 from turning ON, so that the motor M of the power tool 10 will not be energized.

The battery pack 40 will remain electrically locked until an unlock operation using unlock key data is performed in step S714. Otherwise, the battery pack controller 42 goes to step S706 and checks whether an auto lock is needed or not.

In one exemplary example of determining whether the auto lock is needed, if the battery pack 40 is not used for a period of time that is identified in the lock key data as a condition for electrically locking, it is determined that the auto lock is needed and thus the battery pack controller 42 goes to step S712 to automatically lock the battery pack 40.

If the determination is NO in S706, the battery pack controller 42 goes to step S708 and checks whether a lock operation is performed or not. For example, if the user operates the trigger 28 a certain (predefined or predetermined) number of times that is identified in the lock key data as a condition for electrically locking, the lock operation has been performed and then the battery pack controller 42 goes to step S712 to lock the battery pack 40.

On the other hand, if the determination is NO in S708, the battery pack controller 42 goes to step S710 and allows or causes the cut-off switch 20 of the power tool 10 to turn ON in accordance with actuation or operation of the trigger 28 by the user. This is the unlocked state.

FIGS. 8 to 11 respectively show flowcharts of representative, non-limiting processes 800, 900, 1000, 1100 for changing the pass code(s) of the battery pack 40, the power tool 10 and the charger 120. In order to change (or newly set) the pass code(s) of any of these devices, the battery pack 40 and the adapter 70 must be attached to the power tool 10 (steps S802, S804). Then, the user selects a pass code changing mode via the mobile device 100 (e.g., smartphone) in S806. Otherwise, Process 500 in FIG. 5 is performed.

Figure 9:
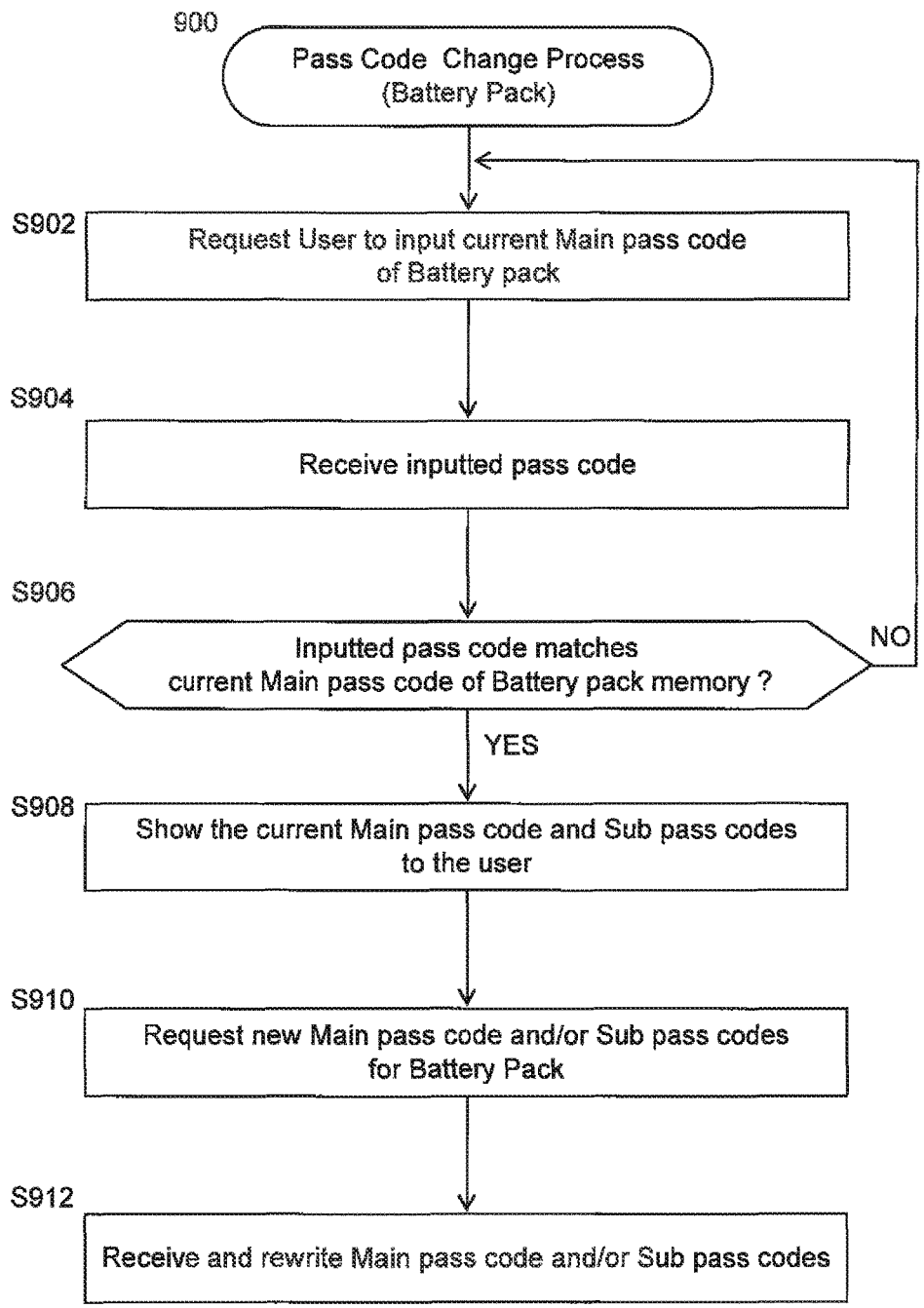
Figure 10:
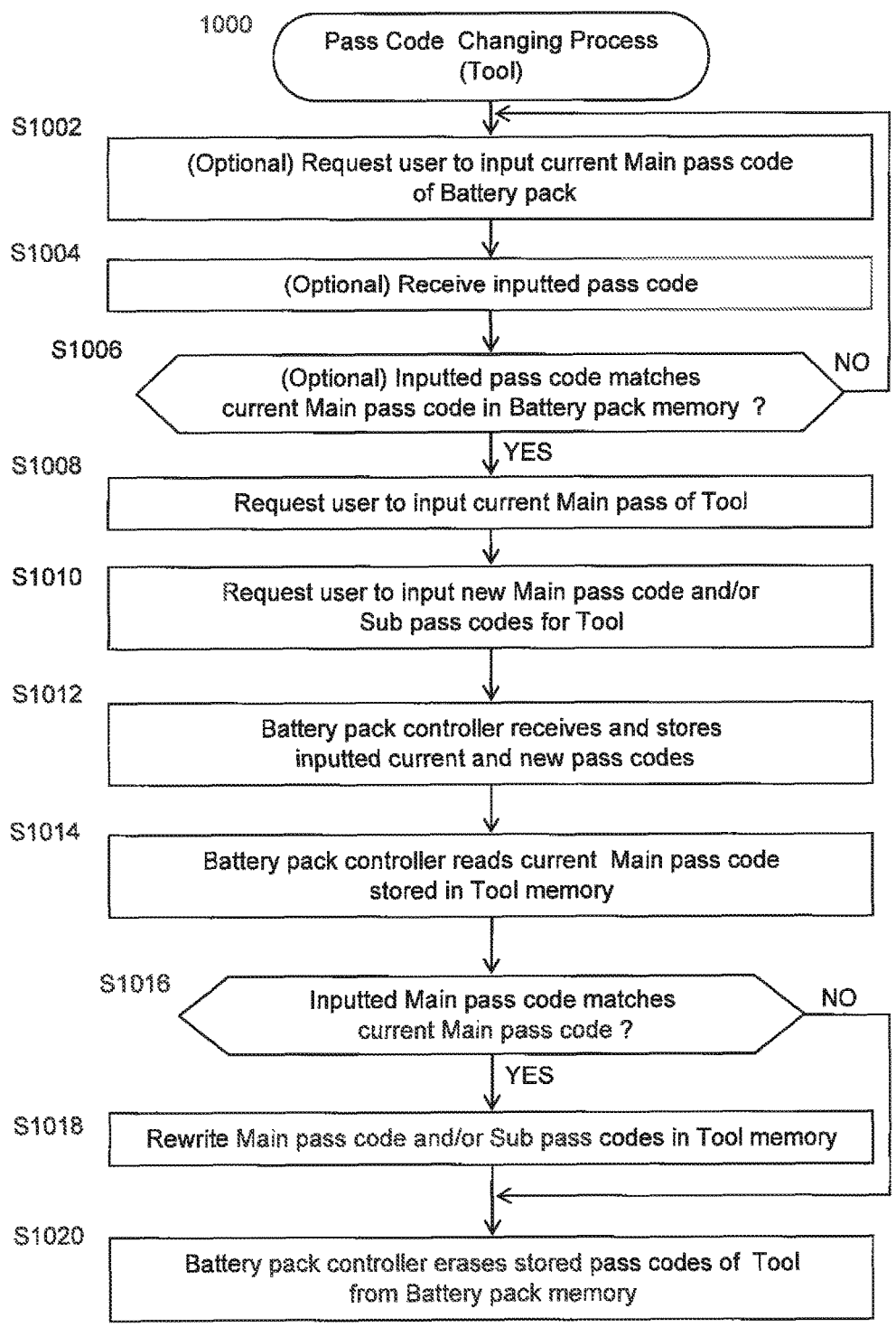
Figure 11:
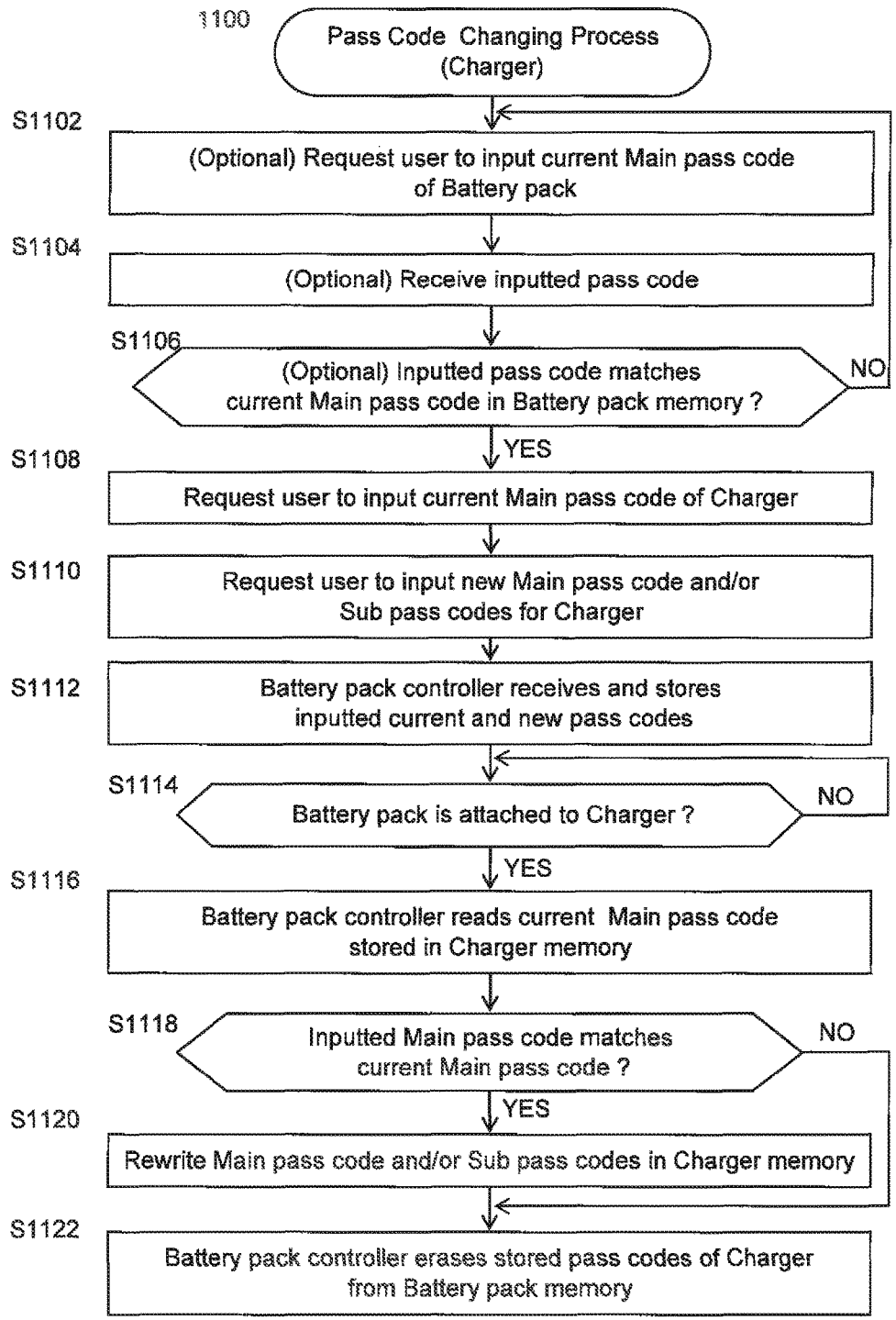

If the user selects to change the pass code(s) of the battery pack 40 in step S808, the process 900 shown in FIG. 9 is performed. If the user selects to change the pass code(s) of the power tool 10 in step S810, the process 1000 shown in FIG. 10 is performed. If the user selects to change the pass code(s) of the charger 120, the process 1100 shown in FIG. 11 is performed.

In the process 900 shown in FIG. 9, the pass code(s) of the battery pack 40 is (are) changed or newly set. A default (i.e. factory-set) main pass code may be stored in a brand new battery pack 40. In step S902, the user is requested to input the current main pass code of the battery pack 40, e.g., via the mobile device 100 or via a user interface on the adapter 70. In step S904, the battery pack controller 42 receives the inputted pass code. In step S906, the battery pack controller 42 verifies/checks/determines whether the inputted pass code matches the main pass code stored in the battery pack memory 46.

If the determination is YES in step S906, the battery pack controller 42 sends the current main pass code and sub pass codes to the adapter 70 and/or the external (mobile) device 100 via the tool controller 12 and then the adapter 70 or external (mobile) device 100 shows (displays) the pass codes to the user in step S908, e.g., on the display 104. In step S910, the adapter 70 or external (mobile) device 100 requests the user to input a new main pass code and/or a sub pass code. In step S912, the battery pack controller 42 receives the new pass code(s) and rewrites the current pass code(s) to the new pass code(s) in the battery pack memory 46. Thus, the pass code(s) of the battery pack 40 can be changed.

In the process 1000 shown in FIG. 10, the pass code(s) of the power tool 10 are changed or newly set. The battery pack controller 42 may also be primarily responsible for carrying out the process of changing/setting the pass code(s) of the power tool 10.

In optional step S1002, the adapter 70 or external (mobile) device 100 requests the user to input the current main pass code of the battery pack 40. In optional step S1004, the battery pack controller 42 receives the inputted pass code. In optional step S1006, the battery pack controller 42 verifies/checks/determines whether the inputted pass code matches the main pass code stored in the battery pack memory 46. If the determination is YES in step S1006, the process goes to step S1008 and allows the user to change the pass code(s) of the power tool 10. That is, in this embodiment, the main pass code of the battery pack 40 is required even when the pass code(s) of the power tool 10 is (are) to be changed. Accordingly, the use of the stolen battery pack 40 to change the pass code(s) of the power tool 10 is prevented. However, steps S1002 to S1006 are optional and may be omitted.

In step S1008, the adapter 70 or external (mobile) device 100 requests the user to input the current main pass code of the power tool 10. In step S1010, the adapter 70 or external (mobile) device 100 requests the user to input a new main pass code and/or a sub pass code(s) for the power tool 10. In step S1012, the battery pack controller 42 receives and stores the pass codes inputted in steps S1008 and S1010. In step S1014, the battery pack controller 42 accesses the tool memory 16 and reads the main pass code of the power tool 10 stored therein. In step S1016, the battery pack controller 42 verifies/checks/determines whether the main pass code inputted in step S1008 matches the main pass code read in step S1014.

If the determination is YES in step S1016, the process goes to step S1018 and rewrites the current pass code(s) to the new pass code(s) in the tool memory 16. Then, the battery pack controller 42 erases the pass code(s) for the power tool 10 from the battery pack memory 46 in step S1020.

If the determination is NO in step S1016, the process goes to step S1020 and erases the pass code(s) for the power tool 10 from the battery pack memory 46 without rewriting the pass code(s) of the power tool 10. Thus, the pass code of the power tool 10 can be changed only if the user knows/inputs the current main pass code of the power tool 10.

In the process 1100 shown in FIG. 11, the pass code(s) of the charger 120 is (are) changed or newly set. Again, the battery pack controller 42 may be primarily responsible for carrying out the process of changing the pass code(s) of the charger 120.

In optional step S1102, the adapter 70 or external (mobile) device 100 requests the user to input the current main pass code of the battery pack 40. In optional step S1104, the battery pack controller 42 receives the inputted pass code. In optional step S1106, the battery pack controller 42 verifies/checks/determines whether the inputted pass code matches the main pass code stored in the battery pack memory 46. If the determination is YES in S1106, the process goes to step S1108 and allows the user to change the pass code of the charger 120. However, similar to the process 1000, steps S1102 to S1106 are also optional and may be omitted.

In step S1108, the adapter 70 or external (mobile) device 100 requests the user to input the current main pass code of the charger 120. In step S1110, the adapter 70 or external (mobile) device 100 requests the user to input a new main pass code and/or a sub pass code(s) for the charger 120. In step S1112, the battery pack controller 42 receives and stores the pass code(s) inputted in steps S1108 and S1110. Note that, at this time the battery pack 40 is attached to the power tool 10 and is separated (detached) from the charger 120. Therefore, the battery pack controller 42 stores the pass code(s) for the charger 120 for subsequent use when the battery pack 40 is attached to the charger 120 in step S1114.

If the determination is YES in step S1114, the process goes to step S1116 and the battery pack controller 42 accesses the charger memory 126 and reads the main pass code of the charger 120 stored therein. In step S1118, the battery pack controller 42 verifies/checks/determines whether the main pass code inputted in step S1108 matches the main pass code read in S1116.

If the determination is YES in step S1018, the process goes to step S1120 and rewrites the current pass code(s) to the new pass code(s) in the charger memory 126. Then, the battery pack controller 42 erases the pass code(s) for the charger 120 from the battery pack memory 46 in step S1122.

If the determination is NO in step S1118, the process goes to step S1122 and erases the pass code(s) for the charger 120 from the battery pack memory 46 without rewriting the pass code(s) of the charger 120.

Thus, the pass code(s) of the charger 120 can be changed only if the user knows/inputs the current main pass code of the charger 120.

In this process, the battery pack 40 acts as a messenger because the adapter 70 or external (mobile) device 100, which includes the user interface, cannot be directly attached to (or directly communicate with) the charger 120. Therefore, in this process, the forwarded pass code is erased from the battery pack memory 46 (memory 49) when the pass code(s) in the charger 120 is (are) rewritten. However, the timing of erasure may also be, but is not limited to, at the time when a predetermined number of chargers 120 are rewritten or at the time when a predetermined period of time has elapsed.

Figure 12:
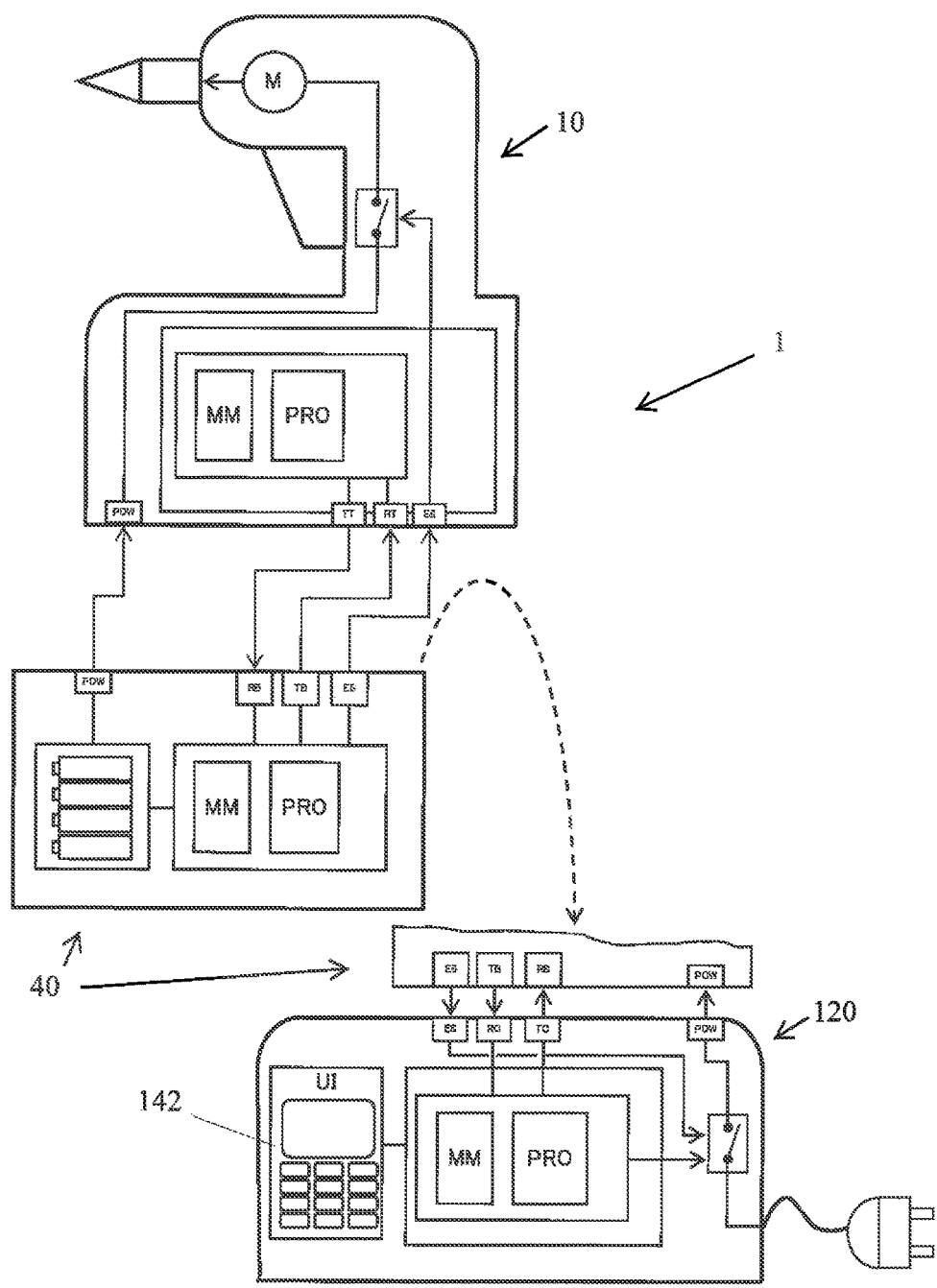
FIG. 12 shows a schematic block diagram of a second embodiment of power tool system according to the present teachings.

FIG. 12 shows a schematic block diagram of a second embodiment of power tool system 1 according to the present teachings. The power tool system 1 again comprises a hand-held power tool 10, a battery pack 40 and a charger 120. However, in this embodiment, the charger 120 includes a user interface 142. Although the size of the charger 120 may be increased by including the user interface 142, the size of the power tool 10 and the battery pack 40 will not be enlarged. The adapter 70 may be omitted in this embodiment or the adapter may be adapted or configured to physically and electrically connect to the charger 120 in order to provide the user interface, such as an alphanumerical keypad and/or a display (e.g., a touch screen).

All other features of the first embodiment described in connection with FIG. 1 may be utilized with the second embodiment and are included herein by reference.

Figure 13:
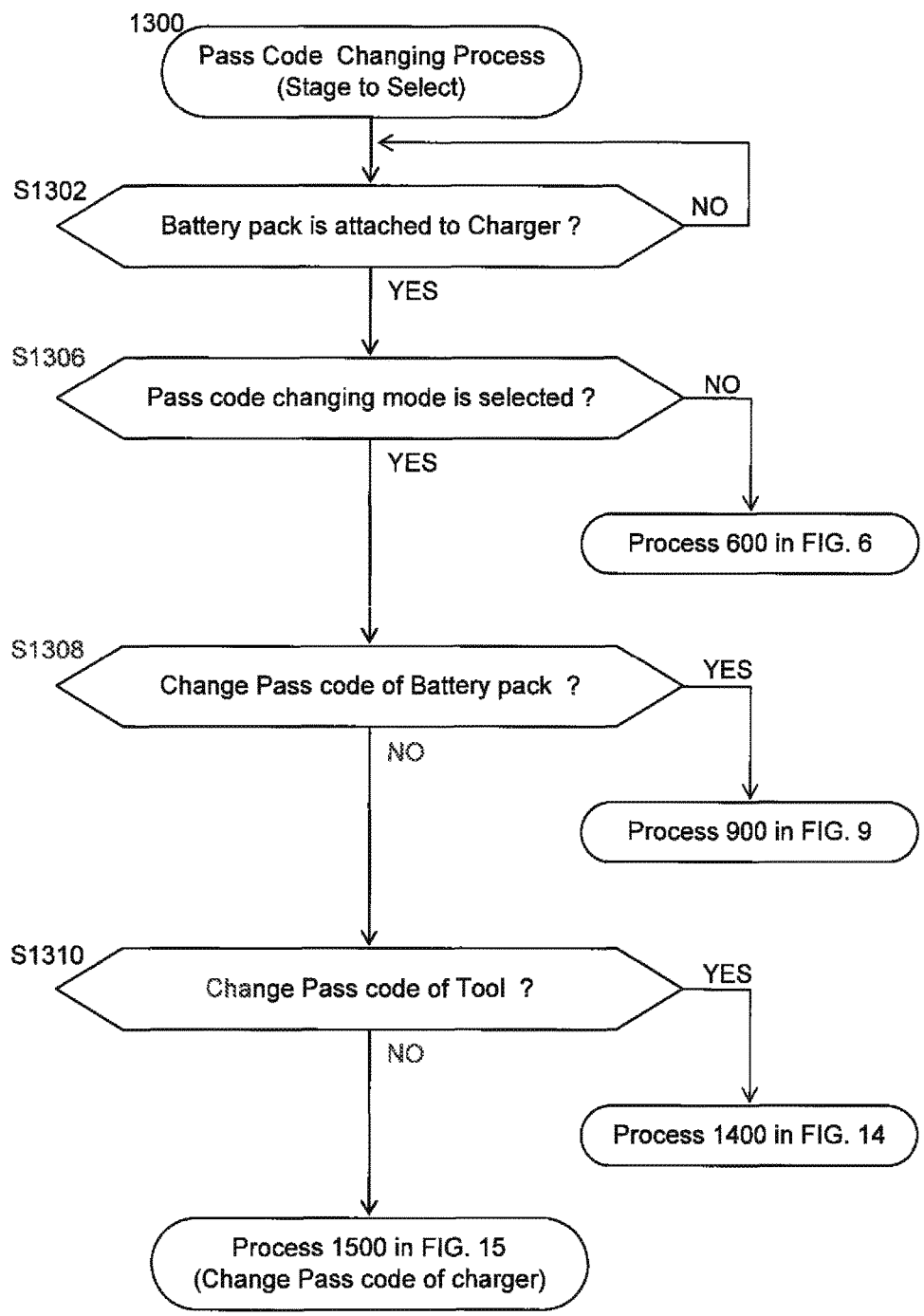
FIGS. 13-15 respectively show flowcharts of representative, non-limiting processes for changing the pass code(s) of the battery pack, the power tool and the charger of the second embodiment.
Figure 14:
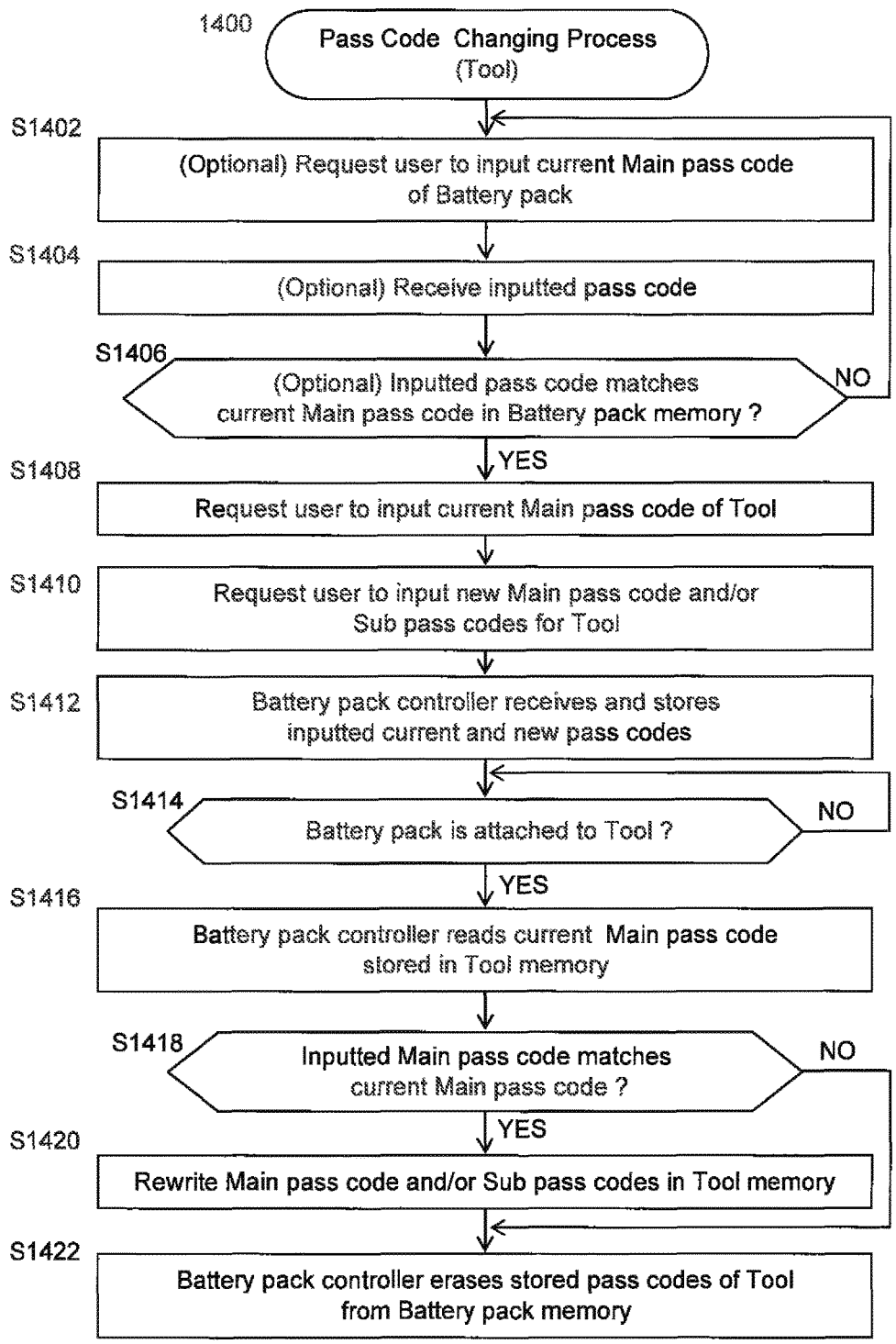
Figure 15:
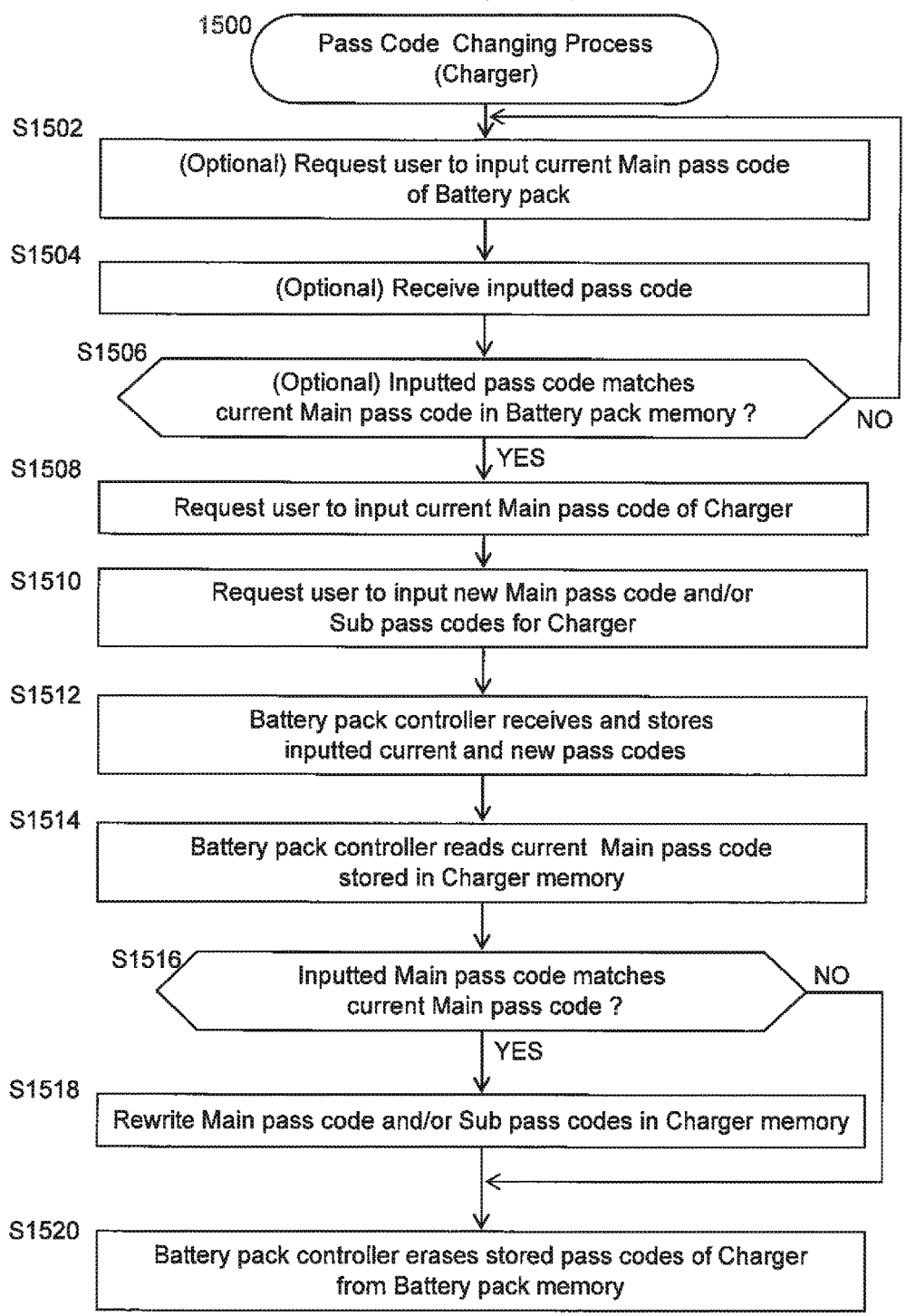

FIGS. 13 to 15 respectively show flowcharts of representative, non-limiting processes for changing the pass code(s) of the battery pack 40, the power tool 10 and the charger 120 of the second embodiment.

In order to change (or newly set) the pass code(s), the battery pack 40 must be attached to the charger 120, as determined in step S1302. Then, in step S1306, the user selects a pass code changing mode using the user interface 142 on the charger 120. Otherwise, the authentication process for charging the battery pack 40 is performed according to the process 600 shown in FIG. 6.

If the user selects to change the pass code(s) of the battery pack 40 in step S1308, the process 900 shown in FIG. 9 is performed as described above. If the user selects to change the pass code(s) of the power tool 10 in step S1310, the process 1400 shown in FIG. 14 is performed. If the user selects to change the pass code(s) of the charger 120, the process 1500 shown in FIG. 15 is performed.

In the process 1400 shown in FIG. 14, the pass code(s) of the power tool 10 are changed or newly set. Again, the battery pack controller 42 may be primarily responsible for executing the process for changing the pass code(s) of the power tool 10, although the charger controller 122 may also execute this process, in whole or in part.

In optional step S1402, the user interface 142 requests the user to input the current main pass code of the battery pack 40. In optional step S1404, the battery pack controller 42 receives the inputted pass code. In optional step S1406, the battery pack controller 42 verifies/checks/determines whether the inputted pass code matches the main pass code stored in the battery pack memory 46. If the determination is YES in step S1406, the process goes to step S1408 and allows the user to change the pass code(s) of the power tool 10. Again, steps S1402 to 1406 are optional and may be omitted.

In step S1408, the user interface 142 requests the user to input the current main pass code of the power tool 10. In step S1410, the user interface 142 requests the user to input a new main pass code and/or a sub pass code(s) for the power tool 10. In step S1412, the battery pack controller 42 receives and stores the pass codes inputted in steps S1408 and S1410. Note that, at this time the battery pack 40 is attached to the charger 120 and is separated (detached) from the power tool 10. Therefore, the battery pack controller stores the pass code(s) for the power tool 10 for subsequent use when the battery pack 40 is attached to the power tool 10 in step S1414.

If the determination is YES in step S1414, the process goes to step S1416 and the battery pack controller 42 accesses the tool memory 46 and reads the main pass code of the power tool 10 stored therein. In step S1418, the battery pack controller 42 verifies/checks/determines whether the main pass code inputted in step S1408 matches the main pass code read in S1416.

If the determination is YES in step S1418, the process goes to step S1420 and rewrites the current pass code(s) to the new pass code(s) in the tool memory 16. Then, the battery pack controller erases the pass code(s) for the power tool 10 from the battery pack memory 46 (memory 49) in step S1422.

If the determination is NO in step S1418, the process goes to step S1422 and erases the pass code for the power tool 10 from the battery pack memory 46 (memory 49) without rewriting the pass code(s) of the power tool 10. In this embodiment, the battery pack 40 acts as the messenger in order to rewrite the pass code(s) of the power tool 10.

In the process 1500 shown in FIG. 15, the pass code(s) of the charger 120 is (are) changed or newly set. Again, the battery pack controller 42 may be primarily responsible for executing this process, although the charger controller 122 may also execute this process, in whole or in part.

In optional step S1502, the user interface 142 requests the user to input the current main pass code of the battery pack 40. In optional step S1504, the battery pack controller 42 receives the inputted pass code. In optional step S1506, the battery pack controller 42 verifies/checks/determines whether the inputted pass code matches the main pass code stored in the battery pack memory 46. If the determination is YES in S1506, the process goes to step S1508 and allows the user to change the pass code of the charger 120. Again, steps S1502 to 1506 are optional and may be omitted.

In step S1508, the user interface 142 requests the user to input the current main pass code of the charger 120. In step S1510, the user interface 142 requests the user to input a new main pass code and/or a sub pass code(s) for the charger 120. In step S1512, the battery pack controller 42 receives and stores the pass code(s) inputted in steps S1508 and S1510. In step S1514, the battery pack controller 42 accesses the charger memory 126 and reads the main pass code of the charger 120 stored therein. In step S1516, the battery pack controller 42 verifies/checks/determines whether the main pass code inputted in step S1508 matches the main pass code read in S1514.

If the determination is YES in step S1516, the process goes to step S1518 and rewrites the current pass code(s) to the new pass code(s) in the charger memory 126. Then, the battery pack controller 42 erases the pass codes for the charger 120 from the battery pack memory 46 (memory 49) in step S1520.

If the determination is NO in step S1516, the process goes to step S1120 and erases the pass code for the charger 120 from the battery pack memory 46 (memory 49) without rewriting the pass code(s) of the charger 120. Thus, the pass code of the charger 120 can be changed only if the user knows/inputs the current main pass code of the charger 120.

Figure 16:
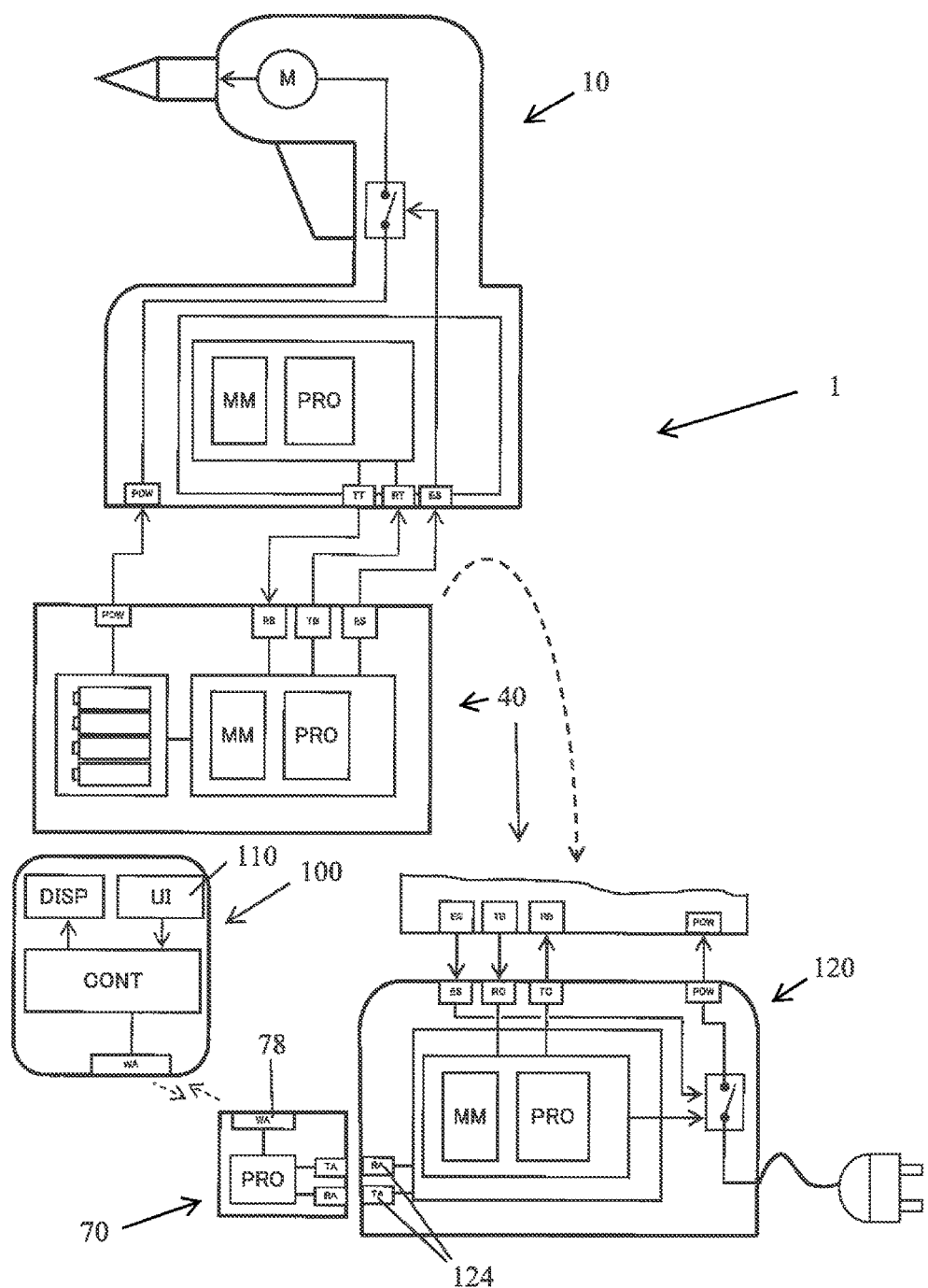
FIG. 16 shows a schematic block diagram of a third embodiment of power tool system according to the present teachings.

FIG. 16 shows a schematic block diagram of a third embodiment of power tool system 1 according to the present teachings. This power tool system 1 again comprises a hand-held power tool 10, a battery pack 40, a charger 120 and adapter 70. However, in this embodiment, the adapter 70 is adapted or configured to be detachably attached to the charger 120 and the adapter 70 serves as a wireless interface with an external phone 100 having a user interface 110. Therefore, the charger 120 includes one or more adapter communication terminal(s) 124 for electrically communicating with the adapter 70.

In the present embodiment, the external device 100 will be exemplified as a mobile device (e.g., a smart phone), although any of the external devices 100 described herein may be utilized with this embodiment.

All other features of the first and second embodiments described in connection with FIGS. 1 and 12 may be utilized with the third embodiment and are included herein by reference.

Figure 17:
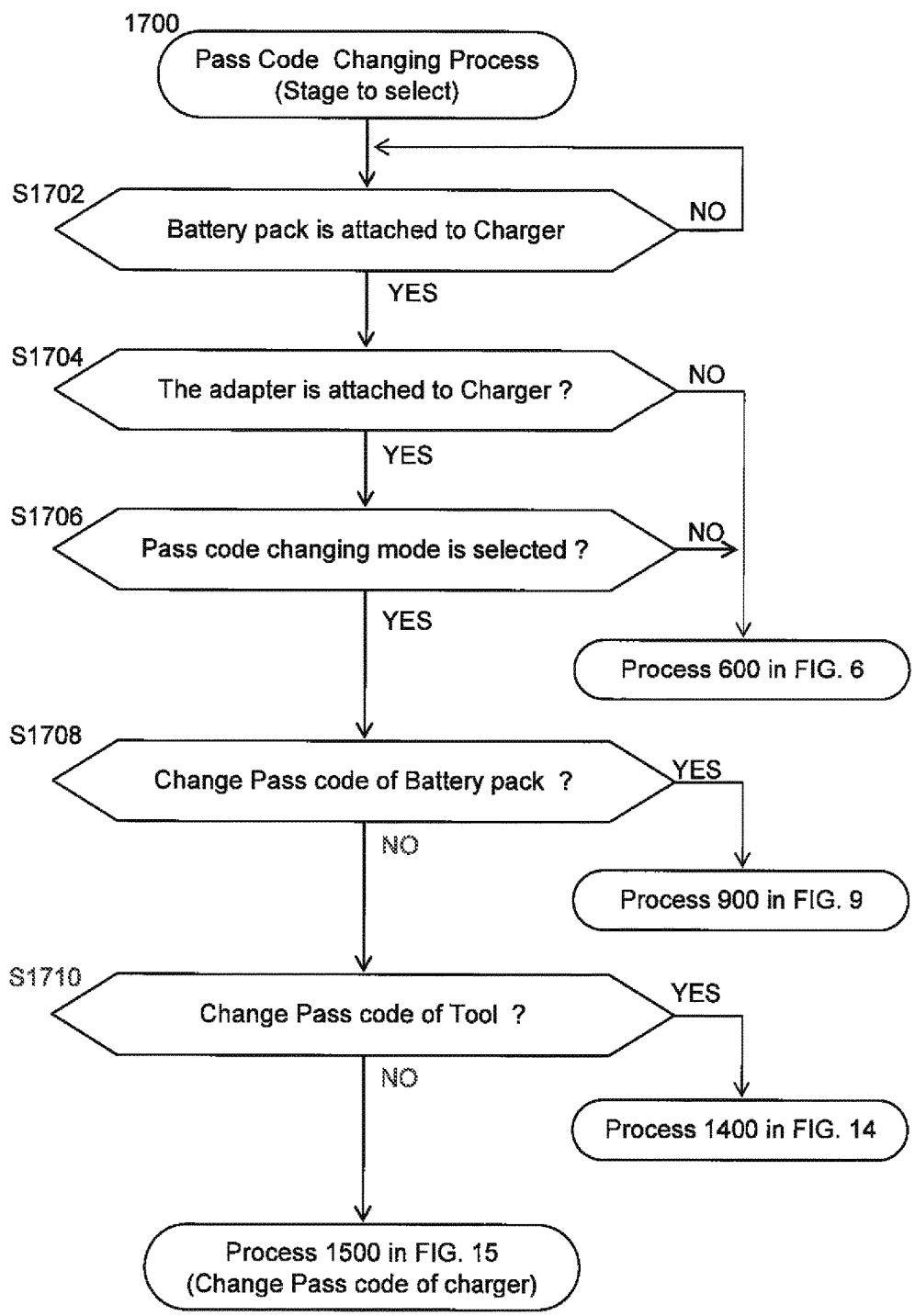
FIG. 17 shows a flowchart of a representative, non-limiting process for changing the pass code(s) of the battery pack, the power tool and the charger of the third embodiment.

FIG. 17 shows a flowchart of a representative, non-limiting process 1700 for changing the pass code(s) of the battery pack 40, the power tool 10 and the charger 120 of the third embodiment.

In order to change (or newly set) the pass code(s) of any of these devices, the battery pack 40 and the adapter 70 must be attached to the charger 120, as determined in steps S1702 and S1704. Then, the user selects a pass code changing mode via the mobile device 100 and the charger 120 in step S1706. Otherwise, the process for charging the battery pack 40 is performed according to the process 600 shown in FIG. 6.

If the user selects to change the pass codes of the battery pack 40 in step S1708, the process 900 shown in FIG. 9 is performed as described above. If the user selects to change the pass codes of the power tool 10 in step S1710, the process 1400 shown in FIG. 14 is performed as described above. If the user selects to change the pass codes of the charger 120, the process 1500 shown in FIG. 15 is performed as described above.

Figure 18:
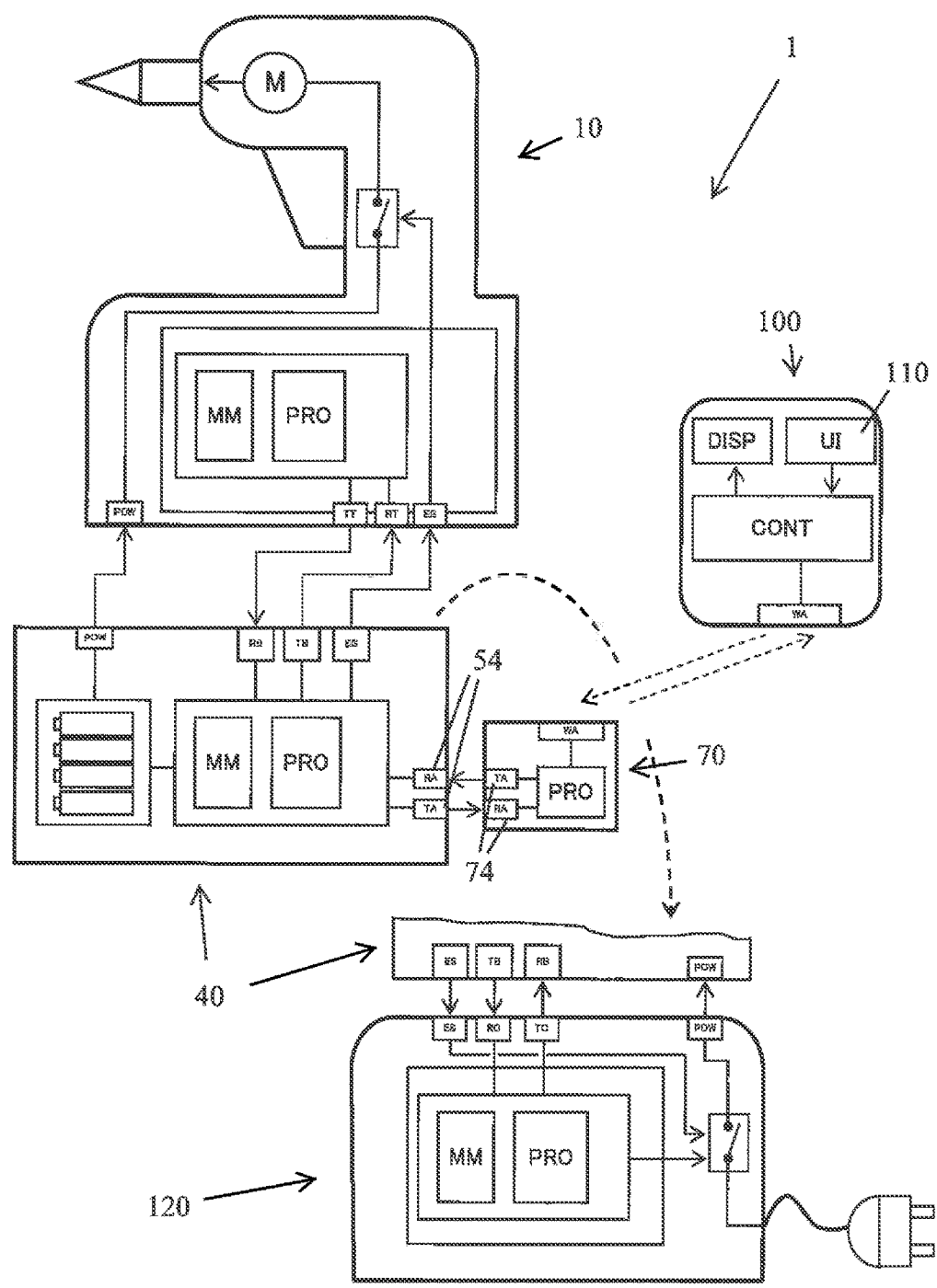
FIG. 18 shows a schematic block diagram of a fourth embodiment of power tool system according to the present teachings.

FIG. 18 shows a schematic block diagram of a fourth embodiment of a power tool system 1 according to the present teachings. Again, the power tool system 1 comprises a hand-held power tool 10, a battery pack 40, a charger 120 and adapter 70.

However, in this embodiment, the adapter 70 is adapted or configured to be detachably attached to the battery pack 40 and again serves as a wireless interface for a mobile phone 100 having a user interface 110. Therefore, the battery pack 40 includes one or more adapter communication terminal(s) 54 for electrically communicating with the adapter 70.

In the present embodiment, the external device 100 again will be exemplified as a mobile device (e.g., a smart phone), although any of the external devices 100 described herein may be utilized with this embodiment.

FIG. 19 shows a flowchart of a representative, not-limiting process 1900 for changing the pass code of the battery pack 40, the power tool 10 and the charger 120 of this embodiment. In order to change (or newly set) the pass code(s), the adapter 70 must be attached to the battery pack 40, as determined in step S1902. However, in this embodiment, it does not matter whether the battery pack 40 is attached to or detached from the power tool 10 or the charger 120.

Then, the user selects a pass code changing mode via the mobile device 100 in step S1906. Otherwise, the process for charging the battery pack 40 (as shown in FIG. 6) is performed.

If the user selects to change the pass codes of the battery pack 40 in step S1908, the process 900 shown in FIG. 9 is performed as described above. If the user selects to change the pass codes of the power tool 10 in step S1910, the process 1400 shown in FIG. 14 is performed as described above. If the user selects to change the pass codes of the charger 120, the process 1100 shown in FIG. 11 is performed.

The above-described embodiments may be modified in various ways without departing from the scope of the present teachings.

For example, in the above-described embodiments, the electronic lock (electronically-actuatable lock) was embodied as a cut off switch 20, 138 that can be controlled to prevent or stop the flow of current to the power tool 10 and/or to the battery pack 40.

However, it is also possible to provide a cut off switch in the battery pack 40, such that the cut off switch prevents or stops the flow of current to the battery terminal(s) 52 in the event that matching pass codes are not found.

In addition or in the alternative, the electronic lock or electronically-actuatable lock can be embodied in one or more of the following ways.

First, the power tool 10 can be adapted or configured to operate the motor M in a random or irregular manner in case matching pass codes are not found. For example, the motor M may be caused to randomly start and stop even though the trigger 28 remains depressed (activated). Such random tool behavior will prevent effective usage of the power tool 10, thereby making it less desirable to steal.

Second, a mechanical lock may be included in the battery pack 40. For example, the mechanical lock may include an engaging device, e.g., a pin, latch, hook, etc., that is movable by an actuator, such as a solenoid. A corresponding aperture or other corresponding/complementary engaging device may be provided in the power tool housing 32 and/or in the charger 120. In case matching codes are not found, the actuator could be caused to move at least one of the engaging devices into engagement with the corresponding/complementary engaging device, so that the battery pack 40 can not be removed or detached from the power tool housing 32 or from the charger 120.

If the battery pack 40 is irremovably attached to the power tool 10, once the battery pack 40 is depleted of its stored energy, the power tool 10 can no longer be used, unless and until the mechanical lock is deactivated so that the battery pack 40 can be removed and recharged.

In the alternative, if the battery pack 40 is irremovably attached to the charger 120, then neither the battery pack 40 nor the charger 120 can be further used, unless and until an appropriate pass code is input to release the mechanical lock.

Third, the battery pack 40 may include a forcible discharge circuit that is activated in case matching pass codes are not found. That is, in case the authorization pass code to use the battery pack 40 is not properly entered, the battery pack 40 will be caused to automatically discharge its stored energy, so that the battery pack 40 can no longer be used.

Fourth, a separate, dedicated cut off switch may be provided in the power tool 10 and/or in the charger 120. That is, in the above-described embodiments, the cut off switch 20 of the power tool 10 may simultaneously be utilized to perform pulse-width modulation (PWM) of the current being supplied to the motor M, as is well known in the art. Thus, in the above-described embodiments, when matching pass codes are found, at least one of the controllers 12, 42 outputs a signal that enables the cut off switch 120 to perform its normal PWM operation. However, when matching pass codes are not found, at least one of the controllers 12, 42 outputs a signal that disables the cut off switch 120 so that it can no longer perform its normal PWM operation.

In the alternative, a first PWM switch (FET) may be provided that is dedicated to controlling the amount of current that is supplied to the motor M. A second switch FET (i.e. a cut off switch) may be dedicated to solely the function of opening and closing the current supply circuit to the motor M.

The charger 120 may be modified in a similar manner.

Fifth, if the pass codes do not match or otherwise correspond in a predetermined manner, a disable signal may be stored in the tool memory 16, e.g., as a disable flag. The tool processor 13 may be programmed to check whether the disable flag has been set in the tool memory 16 prior to initiating PWM control of the PWM switch 20 in response to the user's actuation of the trigger 28. Therefore, if the disable flag is set, the tool processor 13 will be prohibited or blocked from initiating PWM control, thereby cutting off the supply of current to the motor M and preventing further usage of the power tool 10 until the disable flag has been written over.

Finally, although the present teachings were exemplified in detail with respect to an electrically-powered hand-held tool that includes an electrically-drive motor and/or solenoid, the present teachings may be applied to other types of tools and devices, including pneumatically or fuel-driven tools.

REFERENCE SIGNS LIST

1: power tool system
10: cordless power tool
12: controller
13: circuit board
15: microprocessor
16: memory
20: power FET (cut off switch)
22: battery terminals
24: adapter communication terminal(s)
26: battery pack communication terminal(s) (I/O terminal(s))
28: trigger switch
30: tool chuck
31: tool bit
32: housing
40: battery pack
42: controller
45: microprocessor
46: memory
50: battery cell(s)
52: battery terminals
54: adapter communication terminal(s)
56: power tool communication terminal(s) (I/O terminal(s))
70: adapter
72: controller
73: microprocessor
74: communication terminal(s)
76: memory
78: communicator (wireless/user interface)
100: external device (e.g., smart phone)
102: controller
104: display
106: memory
108: communicator
110: data input device/keyboard/touch screen
120: charger
122: controller
123: microprocessor
124: adapter communication terminal(s)
126: memory
132: charging terminals
138: switch
140: plug
142: user interface (e.g., keyboard and/or display)
M: electric motor of power tool

The invention claimed is:

1. A power tool system comprising:
a hand-held power tool including a motor or a solenoid configured to drive a tool, and a first memory that stores a plurality of pass codes that include a main pass code and at least one sub pass code;
a battery pack configured to be detachably attached to, and supply current to, the power tool, the battery pack including a second memory that stores a plurality of pass codes that include a main pass code and at least one sub pass code;
a first electronically-actuatable lock provided in the power tool and/or in the battery pack, the first electronically-actuatable lock being configured to selectively prohibit or impair operation of the power tool; and
a first controller provided in the power tool and/or in the battery pack, the first controller being configured to:
read the pass codes from the first and second memories when the battery pack is attached to the power tool,
directly compare the plurality of pass codes stored in the first memory with the plurality of pass codes stored in the second memory, and
cause the first electronically-actuatable lock to prohibit or impair operation of the power tool when no match is found between at least one of the plurality of pass codes stored in the first memory and at least one of the plurality of pass codes stored in the second memory,
wherein the first controller is further configured to require input of the main pass code to permit:
one of the at least one sub pass code stored in the first memory and/or in the second memory to be changed or
a new sub pass code in addition to the at least one sub pass code to be stored in the first memory and/or in the second memory.

2. The power tool system according to claim 1, further comprising:
a charger configured to be detachably attached to, and to charge, the battery pack, the charger including a third memory that stores at least one pass code;
a second electronically-actuatable lock provided in the charger and/or in the battery pack, the second electronically-actuatable lock being configured to selectively prohibit or impair operation of the charger and/or the battery pack; and
a second controller provided in the battery pack and/or in the charger, the second controller being configured to read the pass codes from the second and third memories when the battery pack is attached to the charger, and to cause the second electronically-actuatable lock to prohibit or impair operation of the charger and/or the battery pack when the pass codes of the second memory and the third memory do not match or otherwise correspond in a predetermined manner.

3. The power tool system according to claim 2, wherein:
the third memory stores a plurality of pass codes, and
the second controller is configured to:
directly compare the plurality of pass codes stored in the second memory with the plurality of pass codes stored in the third memory, and
cause the second electronically-actuatable lock to prohibit or impair operation of the charger and/or the battery pack when no match is found between at least one of the plurality of pass codes stored in the second memory and at least one of the plurality of pass codes stored in the third memory.

4. The power tool system according to claim 3, wherein:
the plurality of pass codes stored in the third memory includes a main pass code and at least one sub pass code, and
the second controller is configured to require input of the main pass code stored in the third memory to permit the at least one of the plurality of pass codes to be stored, deleted and/or rewritten in the third memory.

5. The power tool system according to claim 1, further comprising:

a second controller provided in the power tool and/or in the battery pack, wherein the second controller is configured to cause the first electronically-actuatable lock to prohibit or impair operation of the power tool and/or the battery pack when a predetermined condition is fulfilled, wherein the predetermined condition is at least one of:
a predetermined operation performed by a user,
a predetermined time that has elapsed since the last activation of the power tool,
the activation of the power tool a predetermined number of times, and/or
the charging of the battery pack a predetermined number of times.

6. The power tool system according to claim 1, further comprising:
a charger configured to be detachably attached to the battery pack, the charger having a user interface configured to receive a main pass code and a sub pass code inputted by a user, and
a second controller at least partially provided in the battery pack, the second controller being configured to:
be electrically coupled with the user interface when the battery pack is attached to the charger,
receive the main pass code and a new sub pass code inputted via the user interface, and
rewrite the at least one sub pass code currently stored in the second memory to the inputted new sub pass code when the inputted main pass code matches, or corresponds in a predetermined manner with, the main pass code currently stored in the second memory.

7. The power tool system according to claim 1, further comprising:
a charger configured to be detachably attached to the battery pack, the charger including a third memory configured to store a main pass code and at least one sub pass code and a user interface configured to receive a main pass code and a sub pass code inputted by a user, and
a second controller at least partially provided in the battery pack, the second controller being configured to:
be electrically coupled with the user interface and the third memory of the charger, respectively, when the battery pack is attached to the charger,
receive and store the main pass code and a new sub pass code inputted via the user interface while the battery pack is attached to the charger, and
rewrite the at least one sub pass code currently stored in the third memory of the charger to the inputted new sub pass code when the inputted main pass code matches, or corresponds in a predetermined manner with, the main pass code currently stored in the third memory.

8. The power tool system according to claim 7, wherein the second controller is further configured to:
receive a third pass code inputted via the user interface while the battery pack is attached to the charger, and
perform the operation of receiving and storing the main and sub pass codes only when the inputted third pass code matches, or corresponds in a predetermined manner with, a third pass code stored in the second memory of the battery pack.

9. The power tool system according to claim 1, further comprising:
a charger configured to be detachably attached to the battery pack;

an adapter configured to be detachably attached to the charger, the adapter including a user interface configured to receive a main pass code and a sub pass code inputted by a user, and a second controller at least partially provided in the battery pack, the second controller being configured to:

be electrically coupled with the user interface when the battery pack and the adapter are attached to the charger, receive the main pass code and a new sub pass code inputted via the user interface, and rewrite the at least one sub pass code currently stored in the second memory of the battery pack to the inputted new sub pass code when the inputted main pass code matches, or corresponds in a predetermined manner with, the main pass code currently stored in the second memory.

10. The power tool system according to claim 1, further comprising:

a charger configured to be detachably attached to the battery pack, the charger including a third memory configured to store a main pass code and at least one sub pass code;

an adapter configured to be detachably attached to the charger, the adapter including a user interface configured to receive a main pass code and a sub pass code inputted by a user, and a second controller at least partially provided in the battery pack, the second controller being configured to:

be electrically coupled with the user interface and the third memory of the charger, respectively, when the battery pack and the adapter are attached to the charger, receive and store the main pass code and a new sub pass code inputted via the user interface while the battery pack and the adapter are attached to the charger, and rewrite the at least one sub pass code currently stored in the third memory of the charger to the inputted new sub code when the inputted main pass code matches, or corresponds in a predetermined manner with, the main pass code currently stored in the third memory.

11. The power tool system according to claim 10, wherein the second controller is further configured to:

receive a third pass code inputted via the user interface while the battery pack and the adapter are attached to the charger, and perform the operation of the receiving and storing the main and sub pass codes only when the inputted third pass code matches, or corresponds in a predetermined manner with, a third pass code stored in the second memory of the battery pack.

12. The power tool system according to claim 1, further comprising:

an adapter configured to be detachably attached to the power tool, the adapter including a user interface configured to receive a main pass code and a sub pass code inputted by a user, and a second controller at least partially provided in the battery pack, the second controller being configured to:

be electrically coupled with the user interface when the battery pack and the adapter are attached to the power tool, receive the main pass code and a new sub pass code inputted via the user interface, and rewrite the at least one sub pass code currently stored in the second memory of the battery pack to the inputted new sub pass code when the inputted main pass code matches, or corresponds in a predetermined manner with, the main pass code currently stored in the second memory.

13. The power tool system according to claim 1, further comprising:

an adapter configured to be detachably attached to the power tool, the adapter including a user interface configured to receive a main pass code and a sub pass code inputted by a user, and a second controller at least partially provided in the battery pack, the second controller being configured to:

be electrically coupled with the user interface when the battery pack and the adapter are attached to the power tool, receive and store the main pass code and a new sub pass code inputted via the user interface, and rewrite the at least one sub pass code currently stored in the first memory of the power tool to the inputted new sub pass code when the inputted main pass code matches, or corresponds in a predetermined manner with, the main pass code currently stored in the first memory.

14. The power tool system according to claim 13, wherein the second controller is further configured to:

receive a third pass code inputted via the user interface while the battery pack and the adapter are attached to the power tool, and perform the operation of receiving and storing the main and sub pass codes only when the inputted third pass code matches a third pass code stored in the second memory of the battery pack.

15. The power tool system according to claim 1, further comprising:

an adapter configured to be detachably attached to the battery pack, the adapter including a user interface configured to receive a main pass code and a sub pass code inputted by a user, and a second controller at least partly provided in the battery pack, the second controller being configured to:

be electrically coupled with the user interface when the adapter is attached to the battery pack, receive the main pass code and a new sub pass code inputted via the user interface, and rewrite the at least one sub pass code currently stored in the second memory of the battery pack to the inputted new sub pass code when the inputted main pass code matches, or corresponds in a predetermined manner with, the main pass code currently stored in the second memory.

16. The power tool system according to claim 1, wherein the first electronically-actuatable lock comprises a cut-off switch configured to cut off the supply of current from the battery pack to the motor or solenoid when the cut off switch of the first electronically-actuated lock is turned OFF.

17. The power tool system according to claim 12, wherein the second electronically-actuatable lock comprises a cut-off switch configured to cut off the supply of current from the charger to the battery pack when the cut off switch of the second electronically-actuatable lock is turned OFF.

18. The power tool system according to claim 12, wherein the user interface of the adapter comprises a wireless transceiver.

19. The power tool system according to claim 18, wherein the wireless transceiver is configured to communicate with a smart phone.

20. The power tool system according to claim 12, wherein the user interface of the adapter comprises a manual data input device.

21. The power tool system according to claim 20, wherein the manual data input device comprises a keyboard, push button(s) and/or a touch screen.

22. The power tool system according to claim 12, wherein the adapter is configured to be physically engageable with only the power tool.

23. A method for operating a power tool system, comprising:
  reading a plurality of pass codes that include a main pass code and at least one sub pass code from a first memory of a battery pack while the battery pack is attached to a power tool,
  reading a plurality of pass codes that include a main pass code and at least one sub pass code from a second memory of the power tool while the battery pack is attached to a power tool,
  directly comparing the plurality of pass codes read from the first memory and the plurality of pass codes read from the second memory in a controller provided in the power tool and/or in the battery pack,
  causing a first electronically-actuatable lock located in the power tool and/or the battery pack to prohibit or impair operation of the power tool when no match is found between at least one of the plurality of pass codes stored in the first memory and at least one of the plurality of pass codes stored in the second memory, and
  one of:
  rewriting or deleting at least one of the at least one sub pass code stored in the first memory or in the second memory only upon receiving an input of the main pass code in the controller, or
  storing an additional sub pass code in the first memory or in the second memory only upon receiving an input of the main pass code in the controller.

24. A battery pack system for a hand-held power tool, comprising:
  a battery pack configured to be detachably attached to, and supply current to, the power tool, the battery pack including a first memory that stores a plurality of pass codes that include a main pass code and at least one sub pass code;
  a charger configured to be detachably attached to, and to charge, the battery pack, the charger including a second memory that stores a plurality of pass codes that include a main pass code and at least one sub pass code;
  an electronically-actuatable lock provided in the charger and/or in the battery pack, the electronically-actuatable lock being configured to selectively prohibit or impair operation of the charger and/or the battery pack; and
  a controller provided in the battery pack and/or in the charger, the controller being configured to:
    read the pass codes from the first and second memories when the battery pack is attached to the charger,
    directly compare the plurality of pass codes stored in the second memory with the plurality of pass codes stored in the first memory,
    cause the electronically-actuatable lock to prohibit or impair operation of the charger and/or the battery pack when no match or other correspondence in a predetermined manner is found between at least one of the plurality of pass codes stored in the first memory and at least one of the plurality of pass codes stored in the second memory, and
    require input of the main pass code stored in the first memory to permit one of the at least one sub pass code in the first memory to be changed or to permit a new sub pass code in addition to the at least one sub pass code to be stored in the first memory.

25. The battery pack system according to claim 24, further comprising means for inputting pass codes into the controller,
  wherein the controller is configured to store a new sub pass code inputted via the means for inputting pass codes in the first memory only when the main code currently stored in the first memory is first inputted via the means for inputting pass codes.

* * * * *